(12) United States Patent
Sakhnini et al.

(10) Patent No.: US 12,127,174 B2
(45) Date of Patent: Oct. 22, 2024

(54) FACILITATING COMMUNICATION BASED ON FREQUENCY RANGES

(71) Applicant: QUALCOMM Incorporated, San Diego, CA (US)

(72) Inventors: Iyab Issam Sakhnini, San Diego, CA (US); Tao Luo, San Diego, CA (US); Olufunmilola Omolade Awoniyi-Oteri, San Diego, CA (US); Yan Zhou, San Diego, CA (US); Wanshi Chen, San Diego, CA (US); Juan Montojo, San Diego, CA (US); Peter Gaal, San Diego, CA (US); Qiang Wu, San Diego, CA (US); Mahmoud Taherzadeh Boroujeni, San Diego, CA (US); Junyi Li, Fairless Hills, PA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 17/342,456

(22) Filed: Jun. 8, 2021

(65) Prior Publication Data
US 2022/0022188 A1 Jan. 20, 2022

Related U.S. Application Data

(60) Provisional application No. 63/052,433, filed on Jul. 15, 2020.

(51) Int. Cl.
*H04W 72/0453* (2023.01)
*H04L 5/00* (2006.01)
*H04W 72/51* (2023.01)

(52) U.S. Cl.
CPC ....... *H04W 72/0453* (2013.01); *H04L 5/0048* (2013.01); *H04W 72/51* (2023.01)

(58) Field of Classification Search
None
See application file for complete search history.

(56) References Cited

U.S. PATENT DOCUMENTS 11,617,195 B2* 3/2023 Huang ............... H04L 5/0048
370/329
2020/0314676 A1* 10/2020 Lin ................... H04L 5/0053
(Continued)

FOREIGN PATENT DOCUMENTS

WO 2019154066 A1 8/2019
WO 2019195528 A1 10/2019

OTHER PUBLICATIONS

Ericsson: "Analysis of TCI States Under BWP Switching Requirements", 3GPP Draft, 3GPP TSG RAN WG4 Meeting #92, R4-1909506 TCI and BWP Switch, 3RD Generation Partnership Project (3GPP), vol. RAN WG4, No. Ljubljana, Slovenia, Aug. 26, 2019-Aug. 30, 2019, Aug. 16, 2019 (Aug. 16, 2019), XP051772384, 2 pages, Retrieved from Internet: URL: http://www.3gpp.org/ftp/tsg_ran/WG4_Radio/TSGR4_92/Docs/R4-1909506.zip [retrieved on Aug. 16, 2019], the whole document.
(Continued)

*Primary Examiner* — Phirin Sam
(74) *Attorney, Agent, or Firm* — Arun Swain

(57) ABSTRACT

Apparatus, methods, and computer-readable media for facilitating per bandwidth part TCI state or spatial relation are disclosed herein. For example, aspects disclosed herein provide techniques for enabling a UE (e.g., a reduced capability UE) to associate at least one of a TCI state or a spatial relation with respective hopping regions. An example method for wireless communication at a UE includes determining, while communicating using a first frequency range (Continued)

comprising a first set of frequency hops, at least one of a TCI state or a spatial relation for communicating using a second frequency range comprising a second set of frequency hops. The example method also includes communicating, after switching communication from the first frequency range to the second frequency range, using the second frequency range based on the determined at least one of the TCI state or the spatial relation.

30 Claims, 11 Drawing Sheets

(56) References Cited

U.S. PATENT DOCUMENTS

| | | | |
|---|---|---|---|
| 2020/0404690 A1* | 12/2020 | Lee | H04L 5/005 |
| 2021/0058971 A1* | 2/2021 | MolavianJazi | H04L 5/0044 |
| 2021/0132183 A1* | 5/2021 | Ma | G01S 13/06 |
| 2021/0219336 A1* | 7/2021 | Fan | H04W 72/1273 |
| 2021/0258865 A1* | 8/2021 | Park | H04B 17/318 |
| 2021/0297959 A1* | 9/2021 | Zhou | H04L 5/0051 |
| 2021/0360616 A1* | 11/2021 | Yi | H04W 72/21 |
| 2022/0085934 A1* | 3/2022 | Choi | H04L 5/001 |
| 2022/0131727 A1* | 4/2022 | Khoryaev | H04L 27/261 |
| 2022/0159722 A1* | 5/2022 | Newman | H04W 74/0816 |
| 2022/0311457 A1* | 9/2022 | Yang | H04B 1/0025 |
| 2022/0337362 A1* | 10/2022 | Jiang | H04L 5/0091 |
| 2022/0352923 A1* | 11/2022 | Xu | H04L 5/0098 |
| 2022/0353938 A1* | 11/2022 | Siomina | H04L 1/1854 |
| 2023/0072427 A1* | 3/2023 | Jung | H04B 7/0617 |
| 2023/0140213 A1* | 5/2023 | Awadin | H04L 5/0044 370/329 |
| 2023/0180242 A1* | 6/2023 | Cirik | H04L 5/0023 370/329 |
| 2023/0199890 A1* | 6/2023 | Cirik | H04L 5/0023 370/228 |
| 2023/0328747 A1* | 10/2023 | Yi | H04W 24/08 370/254 |

OTHER PUBLICATIONS

Huawei, et al., "CR on the BWP Switch TCI State Before MAC Activation R15", 3GPP Draft, 3GPP TSG-RAN4 Meeting #93, R4-1914406, 3RD Generation Partnership Project (3GPP), vol. RAN WG4, No. Reno, USA, Nov. 18, 2019-Nov. 22, 2019, Nov. 8, 2019 (Nov. 8, 2019), XP051818805, 3 pages, Retrieved from the Internet: URL: https://ftp.3gpp.brg/tsg_ran/WG4_Radio/TSGR4_93/Docs/R4-1914406.zip R4-1914406 CR on the BWP switch TCI state before MAC activation R15.docx [retrieved on Nov. 8, 2019], the whole document.

International Search Report and Written Opinion—PCT/US2021/036645—ISA/EPO—Sep. 30, 2021.

Panasonic: "On BWP Hopping for Repetitions and Retransmission in NR URLLC", 3GPP Draft, 3GPP TSG RAN WG1 Meeting #94, R1-1808828, Panasonic_NR_URLLC_BWP_Hopping, 3RD Generation Partnership Project (3GPP), vol. RAN WG1, No. Gothenburg, Sweden, Aug. 20, 2018-Aug. 24, 2018, Aug. 10, 2018 (Aug. 10, 2018), XP051516201, 2 pages, Retrieved from the Internet: URL: http://www.3gpp.org/ftp/tsg%5Fran/WG1%5FRL1/TSGR1%5F94/Docs/R1%2D1808828%2Ezip [retrieved on Aug. 10, 2018] sections 2-3, Paragraphs 2 and 3.

Panasonic: "On Support of Faster Inter-Bandwidth Part Hopping for Increased Reliability", 3GPP Draft, 3GPP TSG RAN WG1 Meeting #92bis, R1-1804643, 3RD Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 6, 2018 (Apr. 6, 2018), XP051413332, 3 pages, Retrieved from the Internet: URL: http://www.3gpp.org/ftp/tsg%5Fran/WG1%5FRL1/TSGR1%5F92b/Docs/ [retrieved on Apr. 6, 2018], the whole document.

Vivo: "Remaining Issues on Beam Measurement and Reporting", 3GPP Draft, 3GPP TSG RAN WG1 Meeting #92bis, R1-1803817_Remaining Issues on Beam Measurement and Reporting-Final, 3RD Generation Partnership Project (3GPP), vol. RAN WG1, No. Sanya, China, Apr. 16, 2018-Apr. 20, 2018, Apr. 6, 2018 (Apr. 6, 2018), XP051412999, 4 pages, Retrieved from the Internet: URL: http://www.3gpp.org/ftp/tsg%5Fran/WG1%5FRL1/TSGR1%5F92b/Docs/ [retrieved on Apr. 6, 2018] paragraphs 2.2.1 to 2.2.2 and 3.

* cited by examiner

FACILITATING COMMUNICATION BASED ON FREQUENCY RANGES

CROSS REFERENCE TO RELATED APPLICATION(S)

This application claims the benefit of and priority to U.S. Provisional Application Ser. No. 63/052,433, entitled "METHODS AND APPARATUS TO FACILITATE PER BANDWIDTH PART TRANSMISSION CONFIGURATION INDICATION STATE OR SPATIAL RELATION," and filed on Jul. 15, 2020, which is expressly incorporated by reference herein in its entirety.

TECHNICAL FIELD

The present disclosure relates generally to communication systems, and more particularly, to wireless communication utilizing frequency hops.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for facilitating wireless communication at a user equipment (UE). An example apparatus may determine, while communicating using a first frequency range including a first set of frequency hops, at least one of a transmission configuration indication (TCI) state or a spatial relation for communicating using a second frequency range including a second set of frequency hops. The example apparatus may also communicate, after switching communication from the first frequency range to the second frequency range, using the second frequency range based on the determined at least one of the TCI state or the spatial relation.

In another aspect of the disclosure, a method, a computer-readable medium, and an apparatus are provided for facilitating wireless communication at a base station. An example apparatus may configure a user equipment (UE) with at least one of a first transmission configuration indication (TCI) state or a first spatial relation for communication through a first frequency range associated with a first set of frequency hops. The example apparatus may also configure the UE with at least one of a second TCI state or a second spatial relation for communication through a second frequency range associated with a second set of frequency hops. Additionally, the example apparatus may communicate with the UE through the first frequency range based on at least one of the first TCI state or the first spatial relation. Further, the example apparatus may communicate, after switching communication from the first frequency range to the second frequency range, with the UE through the second frequency range based on at least one of the second TCI state or the second spatial relation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
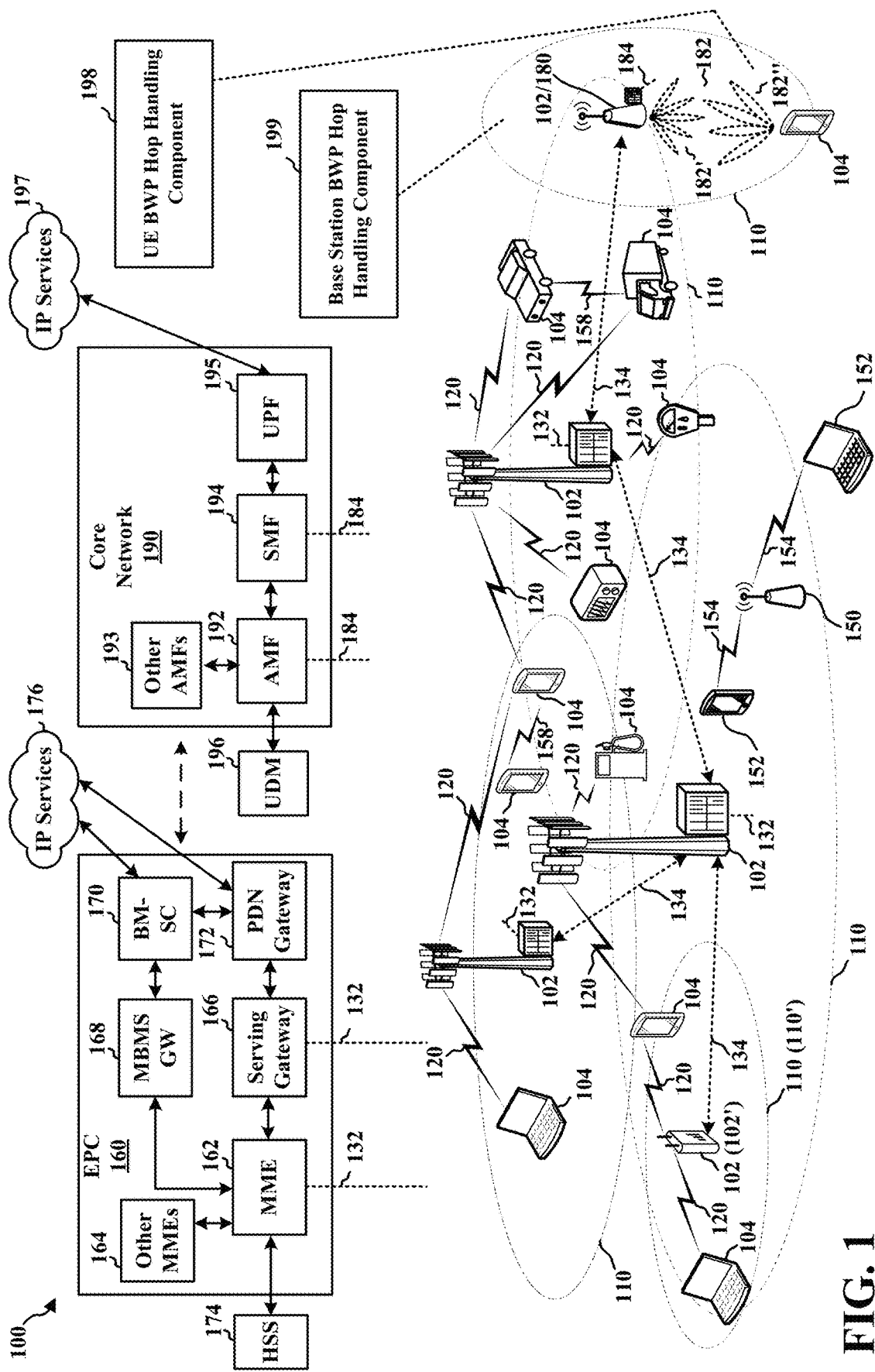
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In some examples, reduced capability UEs within a base station coverage area may incur one or more issues. For example, there may be more persistent interference for reduced capability UEs within a beam and/or across beams. For example, with a moving UE, the distribution of interference at any time may be random, but with a reduced capability UE, such as a stationary device, the distribution of interference may be persistent since the stationary device may be fixed in its location. Additionally, in some examples, due to reduced bandwidth operation, reduced capability UEs may incur performance loss during operation. In some examples, to assist in mitigating such performance loss, a reduced capability UE may employ narrow bandwidth part (BWP) frequency hopping to improve transmission of data. For example, a reduced capability UE may change a carrier frequency within a narrow BWP (e.g., a frequency range) to reduce the likelihood of interference at a specific carrier frequency from impacting a transmission.

In some examples, to facilitate efficient beam utilization and interference management, the base station may be able to control the distribution of UEs among the beams using dynamic scheduling. However, using dynamic scheduling of beam assignments may result in additional overhead. For example, using dynamic beam assignment (e.g., transmission configuration indicator (TCI) state updates) may not be instantaneous and, thus, there may be a delay between when a UE receives an indication for a TCI state update and when the UE is capable of using the indicated TCI state for receiving subsequent downlink messages. For example, when using a TCI state to receive a message, there may be delay between when a TCI state indication is received and when the UE is ready to receive the subsequent message using the indicated TCI state. In addition, in some examples, the UE may continue using an old TCI state when switching BWPs until the TCI state update is received.

Examples disclosed herein provide techniques for enabling a reduced capability UE to associate at least one of a TCI state or a spatial relation with respective hopping regions. For example, disclosed techniques enable associating a first TCI state and/or first spatial relation with a first hopping region and a second TCI state and/or second spatial relation with a second hopping region. In some disclosed examples, when the UE transitions from the first hopping region to the second hopping region, the UE may apply the second TCI state and/or the second spatial relation without waiting for the dynamic scheduling. Additionally, because the UE is configured with the second TCI state and/or the second spatial relation, the UE may begin preparing for the beam switch before the BWP switch and, thus, reducing (or eliminating) the delays associated with when the UE is capable of communicating using the second TCI state and/or the second spatial relation.

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication by applying per BWP TCI states and/or spatial relation configurations performing frequency hopping. For example, the UE 104 may include a reduced capability UE and include a UE BWP hop handling component 198 configured to determine, while communicating using a first frequency range including a first set of frequency hops, at least one of a transmission configuration indication (TCI) state or a spatial relation for communicating using a second frequency range including a second set of frequency hops. In certain aspects, the UE BWP hop handling component 198 may be configured to communicate, after switching communication from the first frequency range to the second frequency range, using the second frequency range based on the determined at least one of the TCI state or the spatial relation.

In another configuration, a base station, such as the base stations 102 and 180, may be configured to manage or more aspects of wireless communication by facilitating per BWP TCI states and/or spatial relation configurations performing frequency hopping. For example, the base stations 102/180 may include a base station BWP hop handling component 199 configured to configure a user equipment (UE) with at least one of a first transmission configuration indication (TCI) state or a first spatial relation for communication through a first frequency range associated with a first set of frequency hops. The base station BWP hop handling component 199 may also be configured to configure the UE with at least one of a second TCI state or a second spatial relation for communication through a second frequency range associated with a second set of frequency hops. Additionally, the base station BWP hop handling component 199 may be configured to communicate with the UE through the first frequency range based on at least one of the first TCI state or the first spatial relation. Further, the example base station BWP hop handling component 199 may be configured to communicate, after switching communication from the first frequency range to the second frequency range, with the UE through the second frequency range based on at least one of the second TCI state or the second spatial relation.

Although the following description provides examples directed to reduced capability UEs, the concepts described herein may be applicable higher capability UEs. Moreover, while the following description provides examples directed to 5G NR, the concepts described herein may be applicable to other similar areas, LTE, LTE-A, CDMA, GSM, and/or other wireless technologies, in which a UE (e.g., a reduced capability UE) may be configured to perform BWP frequency hopping.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
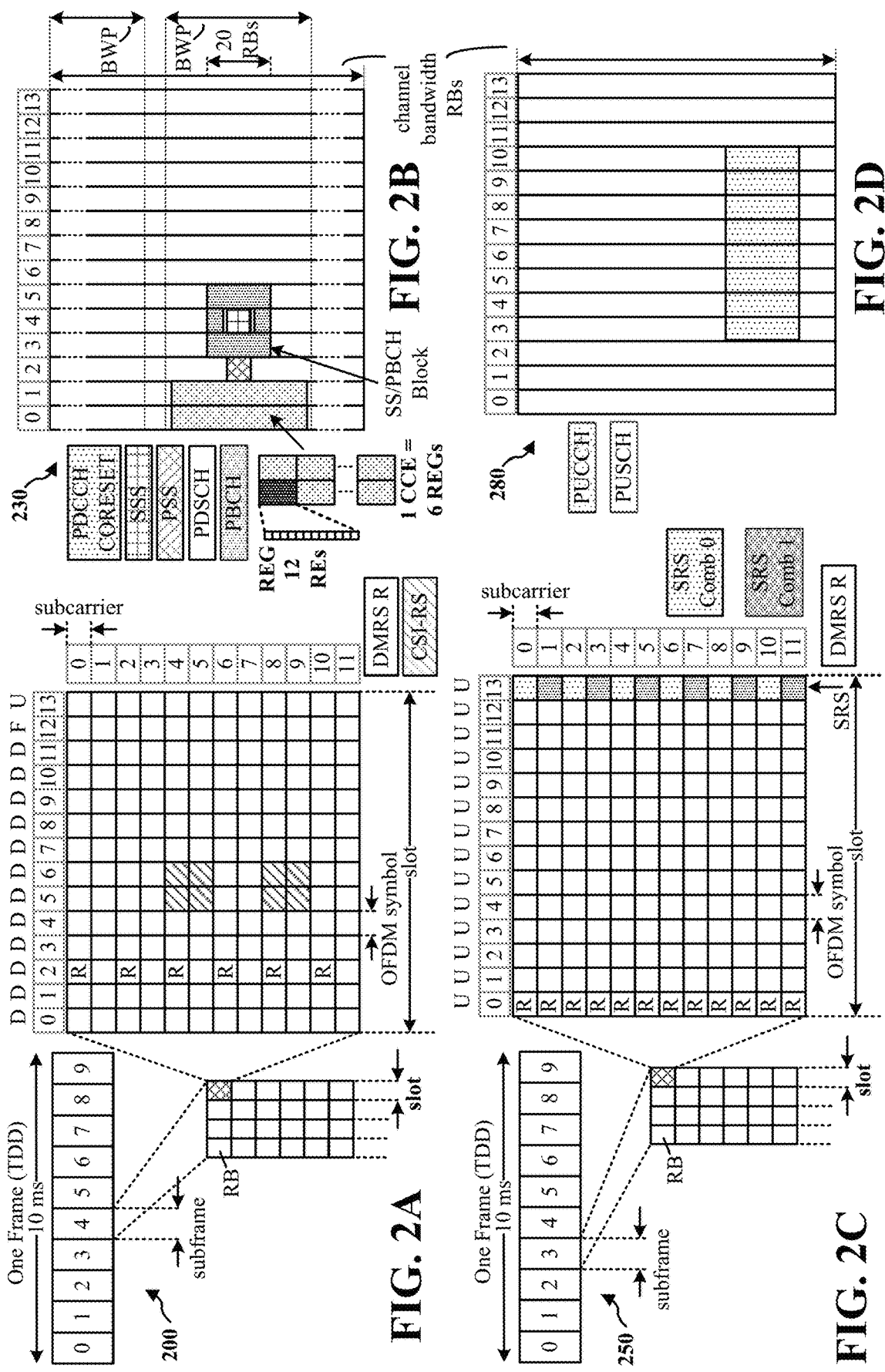
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
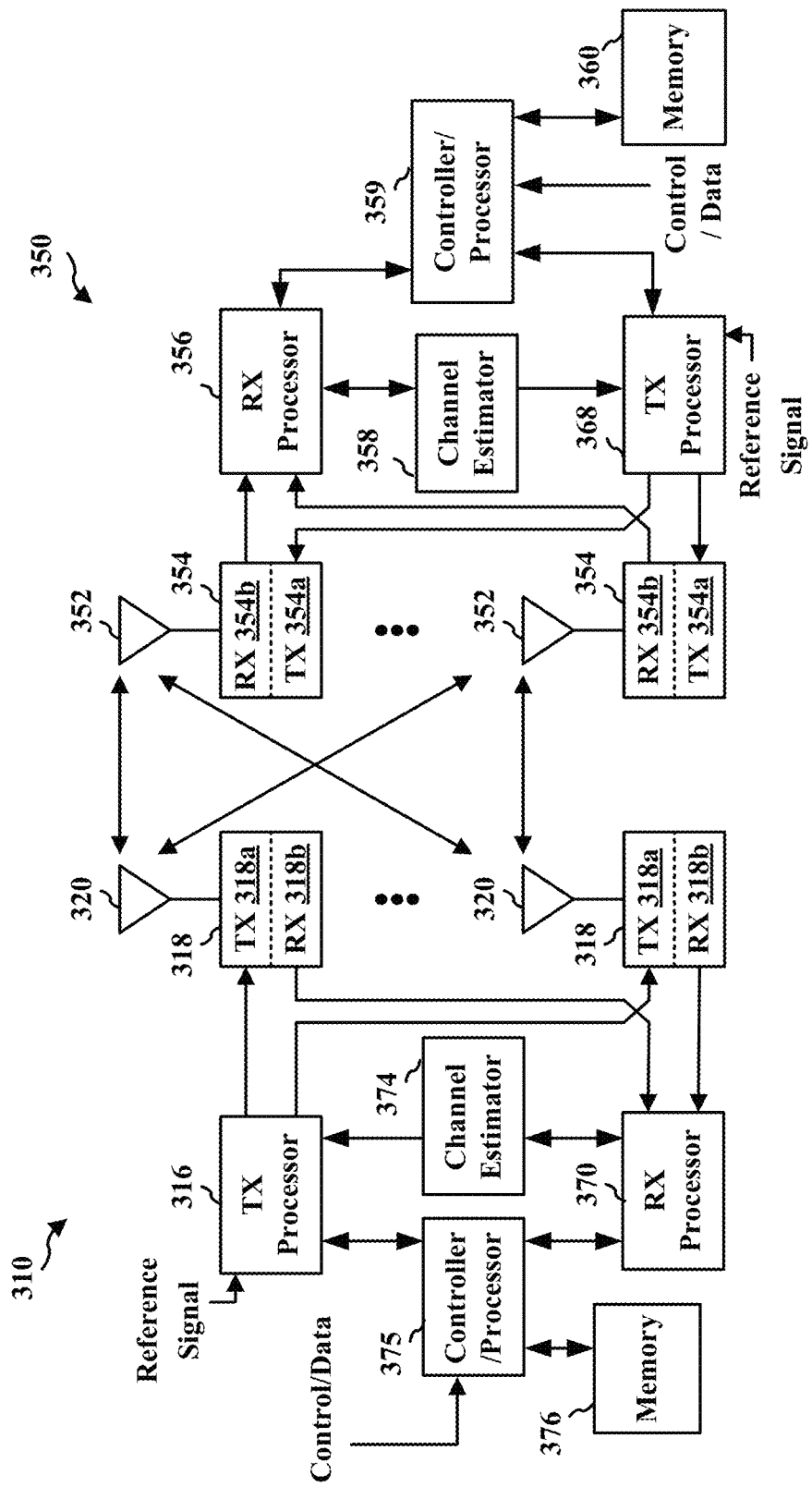
FIG. 3 is a diagram illustrating an example of a base station and UE in an access network.

FIG. 3 is a block diagram of a base station 310 in communication with a UE 350 in an access network. In the illustrated example of FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor and the RX processor implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate an RF carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processos 359 can be associated with the memory 360 that stores program codes and data. The memory 360 may be referred to as a computer-readable medium. In the UL, the controller/processos 359 provides demultiplexing between transport and logical channels, packet reassembly, deciphering, header decompression, and control signal processing to recover IP packets from the EPC 160. The controller/processos 359 is also responsible for error detection using an ACK and/or NACK protocol to support HARQ operations.

Similar to the functionality described in connection with the DL transmission by the base station 310, the controller/processos 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processos 359 may be configured to perform aspects in connection with the UE BWP hop handling component 198 of FIG. 1.

At least one of the TX processor 316, the RX processor 370, and the controller/processor 375 may be configured to perform aspects in connection with the base station BWP hop handling component 199 of FIG. 1.

In addition to higher capability devices, wireless communication may support reduced capability devices. Among others, examples of higher capability devices include premium smartphones, vehicle-to-everything (V2X) devices, URLLC devices, eMBB devices, etc. Among other examples, reduced capability devices may include stationary devices, wearables, industrial wireless sensor networks (IWSN), surveillance cameras, low-end smartphones, etc. For example, NR communication systems may support both higher capability devices and reduced capability devices. A reduced capability device may be referred to as an NR light device, a low-tier device, a lower tier device, etc. Reduced capability UEs may communicate based on various types of wireless communication. For example, smart wearables may transmit or receive communication based on low power wide area (LPWA)/mMTC, relaxed IoT devices may transmit or receive communication based on URLLC, sensors/cameras may transmit or receive communication based on eMBB, etc.

In some examples, a reduced capability UE may have an uplink transmission power of at least 10 dB less than that a higher capability UE. As another example, a reduced capability UE may have reduced transmission bandwidth or reception bandwidth than other UEs. For instance, a reduced capability UE may have an operating bandwidth between 5 MHz and 10 MHz for both transmission and reception, in contrast to other UEs which may have 20-100 MHz bandwidth. As a further example, a reduced capability UE may have a reduced number of reception antennas in comparison to other UEs. For instance, a reduced capability UE may have just over a single receive antenna and may experience a lower equivalent receive signal to noise ratio (SNR) in comparison to higher capability UEs that may have multiple antennas. Reduced capability UEs may also have reduced computational complexity than other UEs.

In some examples, reduced capability UEs within a base station coverage area may incur one or more issues. For example, there may be more persistent interference for reduced capability UEs within a beam and/or across beams. For example, with a moving UE, the distribution of interference at any time may be random, but with a reduced capability UE, such as a stationary device, the distribution of interference may be persistent since the stationary device may be fixed in its location. Additionally, in some examples, due to reduced bandwidth operation, reduced capability UEs may incur performance loss during operation.

In some examples, to assist in mitigating such performance loss, a reduced capability UE may employ narrow bandwidth part (BWP) frequency hopping to improve transmission of data. For example, a reduced capability UE may change a carrier frequency within a narrow BWP (e.g., within a frequency range) to reduce the likelihood of interference at a specific carrier frequency from impacting a transmission. For example, a 400 MHz BWP may include eight 50 MHz BWP frequency ranges across which the reduced capability UE may perform frequency hopping. In some examples, a reduced capability UE may employ BWP hop regions within which the reduced capability UE may perform frequency hopping to account for instances in which same BWP locations may not be used for relatively long periods.

In some examples, when the UE performs frequency hopping from a first hopping region to a second hopping region, the UE may not be configured with an updated TCI state to receive downlink communications and/or an updated spatial relation to transmit uplink communications. In some such examples, the UE may use the old TCI state or old spatial relation (e.g., associated with the first hopping region) until a media access control-control element (MAC-CE) is received providing the updated TCI state and/or updated spatial relation. However, it may be appreciated that using the old TCI state and/or old spatial relation may result in less than optimal communication.

In addition, it may be appreciated that dynamic beam assignment (e.g., TCI state updates and/or spatial relation updates) may not be instantaneous and, thus, there may be a delay. For example, when using a first TCI state to receive a message, there may be delay between when a TCI state update indication is received and when the UE is ready to receive the subsequent message using the indicated TCI state. For example, when the base station transmits a TCI state indication to a UE using a MAC-CE, the base station may wait to receive an acknowledgment message (ACK) associated with the TCI state indication from the UE and then wait a duration before scheduling the subsequent message to the UE. Thus, it may be appreciated using dynamic scheduling of beam assignments may result in scheduling constraints as the base station accounts for the delays between when a TCI state is indicated and when the UE is capable of using the indicated TCI state for receiving a message. Moreover, when the UE performs frequency hopping from the first hopping region to the second hopping region, the UE may apply the old TCI state or old spatial relation (e.g., associated with the first hopping region) for communications until the delay is accounted for in the second hopping region and then apply the updated TCI state or updated spatial relation for communications after the delay is accounted in the second hopping region.

Figure 4:
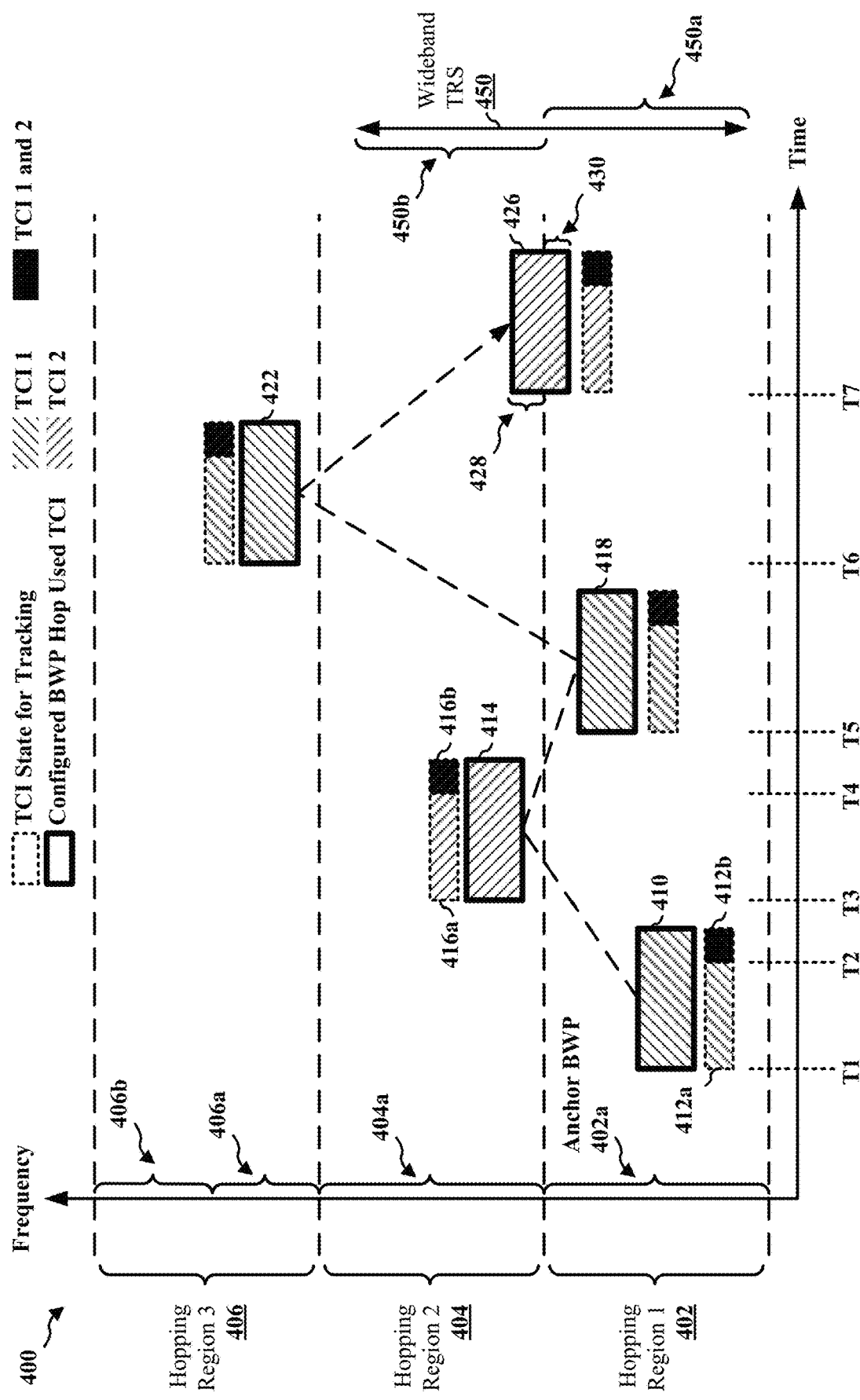
FIG. 4 illustrates an example frequency hopping pattern, in accordance with one or more aspects of this disclosure.

FIG. 4 illustrates an example frequency hopping pattern 400, in accordance with one or more aspects of this disclosure. In the illustrated example of FIG. 4, the frequency hopping pattern 400 depicts a sequence of frequency hops across which a UE (e.g., a reduced capability UE and/or the UE 104 of FIG. 1) may perform frequency hopping over time. For example, at a first time T1, the UE may monitor for control signaling from a base station at a first frequency hop 410. At a third time T3, the UE may monitor for control signaling from a base station at a second frequency hop 414. Similarly, at a fifth time T5, the UE may monitor for control signaling from a base station at a third frequency hop 418, at a sixth time T6, the UE may monitor for control signaling from a base station at a fourth frequency hop 422, and at a seventh time T7, the UE may monitor for control signaling from a base station at a fifth frequency hop 426. In an example, the hopping regions (e.g., hopping regions 402, 404, 406) may correspond to different respective BWP(s). For example, the first hopping region 402 may correspond to a first set of BWPs, the second hopping region 404 may correspond to a second set of BWPs, and the third hopping region 406 may correspond to a third set of BWPs. A set of BWPs may include one or more BWPs. For example, the first hopping region 402 and the second hopping region 404 include single respective BWPs 402a, 404a, and the third hopping region 406 includes a first BWP 406a and a second BWP 406b. In other examples, the hopping regions (e.g., the hopping regions 402, 404, 406) may correspond to different hop regions within a single BWP. The concepts described herein may be applied to various sizes of frequency ranges.

In the illustrated example, the BWP 402a corresponds to an anchor BWP. An anchor BWP may be a BWP that the reduced capability UE returns to periodically. For example, the reduced capability UE may periodically return to the BWP 402a to perform radio resource management (RRM), paging, etc.

In the illustrated example of FIG. 4, the bandwidth across which the UE may perform the frequency hopping is divided into three different frequency ranges (e.g., a first hopping region 402, a second hopping region 404, and a third hopping region 406). In some examples, each of the hopping regions 402, 404, 406 may be associated with a similar quantity of resources. For example, each of the hopping regions 402, 404, 406 may be 50 MHz ranges. In some examples, one or more of the hopping regions 402, 404, 406 may be associated with different quantities of resources. For example, the first hopping region 402 may be associated with a 100 MHz range, the second hopping region 404 may be associated with a 200 MHz range, and the third hopping region 406 may be associated with a 100 MHz range. The specific sizes of ranges are merely examples to illustrate the concept. The aspects presented herein may be applied to frequency ranges or hopping regions of any size.

In some examples, a hopping region may include one or more frequency hops of a frequency hopping pattern. For example, in the illustrated example of FIG. 4, the first hopping region 402 includes the first frequency hop 410 and the third frequency hop 418, the second hopping region 404 includes the second frequency hop 414, and the third hopping region 406 includes the fourth frequency hop 422. In some examples, a frequency hop may overlap with hopping regions. For example, in the illustrated example of FIG. 4, the fifth frequency hop 426 overlaps with the first hopping region 402 and the second hopping region 404.

In some examples, different frequency ranges may be associated with varying capabilities and/or properties. For example, different frequency ranges may be associated with different interference (e.g., narrowband interference). In some examples, depending on the frequency range that the reduced capability UE is monitoring, different TCI states may be used by the reduced capability UE to receive messages and/or different spatial relations may be used by the reduced capability UE to transmit messages. For example, in the illustrated example of FIG. 4, the reduced capability UE may use a first TCI state (e.g., "TCI 1") to receive downlink messages when monitoring the first hopping region 402, may use a second TCI state (e.g., "TCI 2") to receive downlink messages when monitoring the second hopping region 404, and may use the first TCI state (e.g., "TCI 1") to receive downlink messages when monitoring the third hopping region 406.

However, as described above, in some examples, when the reduced capability UE switches to a new BWP (e.g., from the first frequency hop 410 to the second frequency hop 414), the UE may not be configured to with the TCI state for receiving downlink messages and/or the spatial relation for transmitting uplink messages in the new BWP (e.g., at the second frequency hop 414). In some such examples, the reduced capability UE may continue to use the TCI state and/or the spatial relation associated with the old frequency hop (e.g., the first frequency hop 410), but the old communication parameters (e.g., the TCI state and/or the spatial relation associated with the first frequency hop 410) may be not be suitable for communication by the reduced capability UE at the new frequency hop.

Examples disclosed herein provide techniques for enabling a reduced capability UE to associate at least one of a TCI state or a spatial relation with respective hopping regions. For example, disclosed techniques enable associating a first TCI state and/or first spatial relation with a first hopping region and a second TCI state and/or second spatial relation with a second hopping region. In some disclosed examples, when the UE transitions from the first hopping region to the second hopping region, the UE may apply the second TCI state and/or the second spatial relation without waiting for the dynamic scheduling. The TCI state may refer to one or more downlink reference signals or downlink signals, such as a tracking reference signal (TRS), CSI-RS, DM-RS, PDCCH, PDSCH, etc. The spatial relation may refer to one or more uplink reference signals or uplink signals, such as SRS, PUCCH, PUSCH, etc.

In some examples, the reduced capability UE may associate a default TCI state or a default spatial relation with an anchor BWP. An anchor BWP may be a BWP that the reduced capability UE returns to periodically. For example, the reduced capability UE may periodically return to the BWP 402a associated with the first hopping region 402 to perform radio resource management (RRM), paging, etc.

In some examples, the TCI states and/or spatial relations may be associated with a same transmission-reception point (TRP), may be associated with different TRPs having a same physical layer cell identity (PCI), or may be associated with different TRPs having different PCIs. In some examples in which the reduced capability UE is capable of supporting multiple TCIs (sometimes referred to as "m-TRP"), the reduced capability UE may apply different rulings per TCI state or for both TCI states.

In some examples, the TCI states and/or spatial relations associated with a new hopping region may be non-activated. In some examples, the reduced capability UE may use the current (or old) TCI state and/or spatial relation for the new hopping region. In some examples, the reduced capability UE may use a default TCI state and/or a default spatial relation for the new hopping region. In some examples, the reduced capability UE may use the TCI states and/or spatial relations associated with the new hopping region (e.g., an implicit activation of the TCI state or the spatial relation).

In some examples the TCI states and/or spatial relations may be applicable to at least one of downlink channels, uplink channels, or messages in the new hopping region. In some examples, the TCI states and/or spatial relations may be applicable to at least one of a specific downlink channel, a specific uplink channel, or a specific message in the new hopping region.

In some examples, when the reduced capability UE is configured with the new communication parameters (e.g., the new TCI state and/or the new spatial relation associated with the second frequency hop 414), there may be a delay while the reduced capability UE transitions from the old communication parameters to the new communication parameters. In some such examples, while monitoring at the second frequency hop 414, the reduced capability UE may apply the old communication parameters (e.g., the TCI state and/or the spatial relation associated with the first frequency hop 410) before the communication parameters transition is complete and may apply the new communication parameters (e.g., the new TCI state and/or the new spatial relation associated with the second frequency hop 414) after the communication parameters transition is complete.

Examples disclosed herein provide techniques for enabling a reduced capability UE to be configured to track a wideband TRS across hopping regions. For example, as the reduced capability UE is configured with the second TCI state and/or the second spatial relation, the reduced capability UE may begin preparing for the beam switch before the BWP switch and, thus, reducing (or eliminating) the delays associated with when the UE is capable of communicating using the second TCI state and/or the second spatial relation. For example, disclosed techniques enable the reduced capability UE to determine, while at the first frequency hop 410, that a wideband TRS is activated to be tracked and is configured to be within the first hopping region 402 and the second hopping region 404. In some such examples, the reduced capability UE may track the wideband TRS in the second hopping region 404 before switching the communication from the first frequency hop 410 to the second frequency hop 414. Thus, by starting to track the wideband TRS while at the first frequency hop 410, the reduced capability UE is capable of reducing (or eliminating) beam switch timing delays that may be associated with switching from the old communication parameters to the new communication parameters.

For example, as shown in FIG. 4, the reduced capability UE is configured to apply the first TCI state for tracking 412a while at the first frequency hop 410, and the reduced capability UE is configured to apply the second TCI state for tracking 416a while at the second frequency hop 414. When the reduced capability UE is configured to track a wideband TRS (e.g., an example wideband TRS 450) across BWPs (e.g., from the first hopping region 402 to the second hopping region 404), the reduced capability UE may start tracking the wideband TRS 450 using the communication parameters associated with the first hopping region (e.g., the TCI state 1) and also using the communication parameters associated with the second hopping region (e.g., the TCI state 2) at a second time T2 (e.g., the first and second TCI states 412b). In some such examples, the reduced capability UE may reduce (or eliminate) the delay associated with switching from the TCI state 1 to the TCI state 2 while at the second frequency hop 414 (e.g., at time T3). Similarly, when switching from the second frequency hop 414 to the third frequency hop 418, the reduced capability UE may start tracking the wideband TRS 450 using the communication parameters associated with the second hopping region (e.g., the TCI state 2) and also using the communication parameters associated with the first hopping region (e.g., the TCI state 1) at a fourth time T4 (e.g., the first and second TCI states 416*b*) to facilitate reducing (or eliminating) the delay associated with switching from the TCI state 2 to the TCI state 1 while at the third frequency hop 418 (e.g., at time T5).

As shown in FIG. 4, the example wideband TRS 450 spans at least a portion of the first hopping region 402 and a portion of the second hopping region 404. For example, a first portion 450*a* of the wideband TRS 450 is within the first hopping region 402 and a second portion 450*b* of the wideband TRS 450 is within the second hopping region 404. Although the example wideband TRS 450 of FIG. 4 is illustrated to span portions of two hopping regions, it may be appreciated that in other examples, the wideband TRS 450 may span portions of two or more hopping regions.

It may be appreciated that in some examples, a frequency hop may overlap with two or more hopping regions. For example, as shown in FIG. 4, the fifth frequency hop 426 overlaps with the first hopping region 402 and the second hopping region 404. In some examples, the reduced capability UE may determine to use default communication parameters at the new frequency hop. For example, when operating at the fifth frequency hop 426, the reduced capability UE may apply a default TCI state associated with SSB, CSI-RS, etc. In some examples, the reduced capability UE may determine to split the frequency hop into N regions covering the N TCI states or spatial relations. For example, as the fifth frequency hop 426 is associated with two TCI states, the reduced capability UE may determine to split the fifth frequency hop into two regions that correspond to the two TCI states. In some examples, the reduced capability UE may determine to use the communication parameters for the hopping region with the most frequency overlap. For example, as shown in FIG. 4, the fifth frequency hop 426 includes a first portion 428 that overlaps with the second hopping region 404 and a second portion 430 that overlaps with the first hopping region 402. In some such examples, the reduced capability UE may determine which of the two portions 428, 430 is larger and determine to apply the communication parameters (e.g., the TCI state and/or the spatial relation) associated with the corresponding hopping region. For example, if the first portion 428 is larger than the second portion 430 (e.g., the fifth frequency hop 426 has greater overlap with the second hopping region 404), the reduced capability UE may apply the TCI state 2 while operating at the fifth frequency hop 426, and if the second portion 430 is larger than the first portion 428 (e.g., the fifth frequency hop 426 has greater overlap with the first hopping region 402), the reduced capability UE may apply the TCI state 1 while operating at the fifth frequency hop 426.

Figure 5:
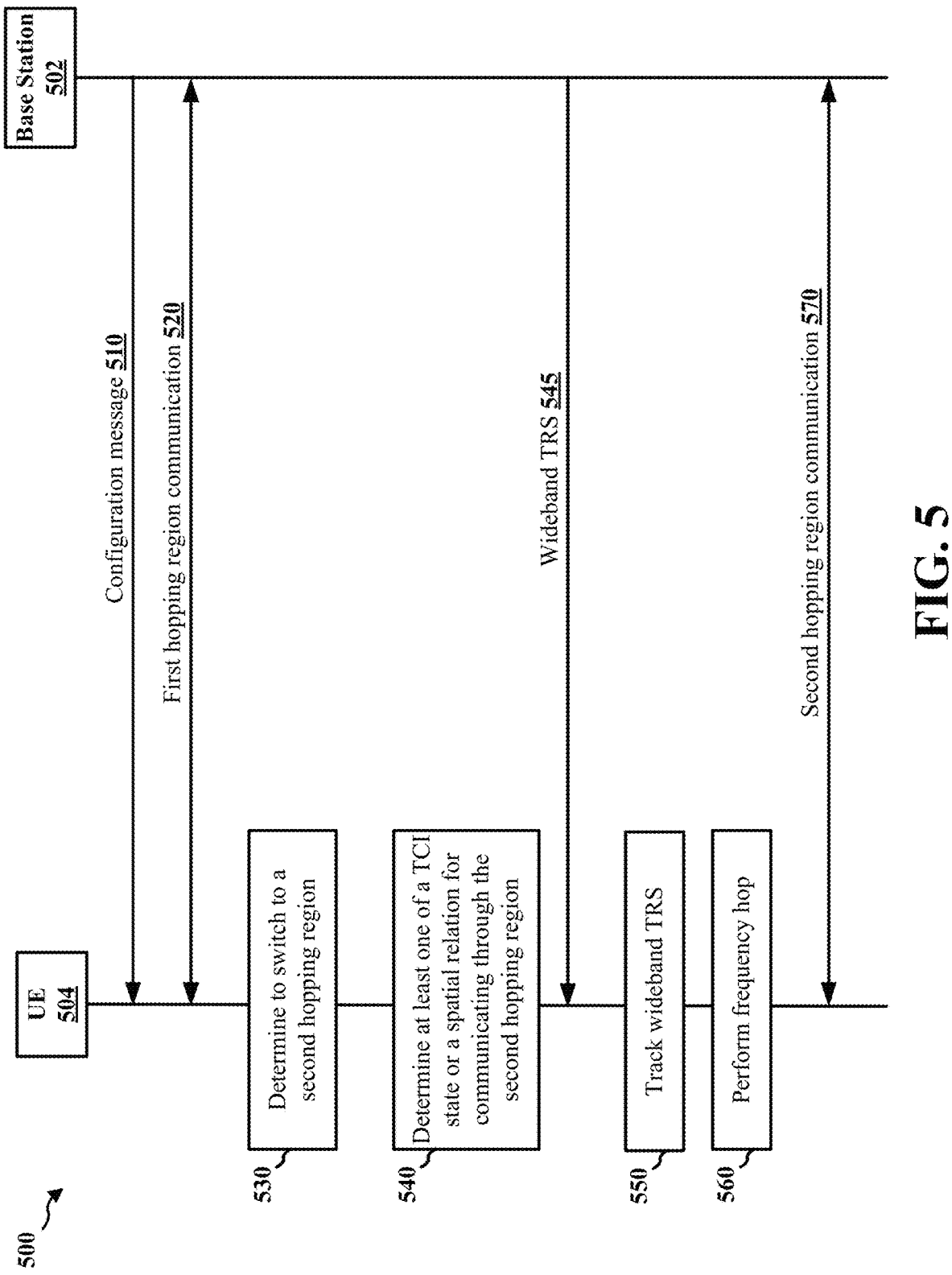
FIG. 5 is an example communication flow between a base station and a UE, in accordance with one or more aspects of this disclosure.

FIG. 5 illustrates an example communication flow 500 between a base station 502 and a UE 504, as presented herein. Aspects of the base station 502 may be implemented by the base station 102/180 of FIG. 1 and/or the base station 310 of FIG. 3. Aspects of the UE 504 may be implemented by the UE 104 of FIG. 1 and/or the UE 350 of FIG. 3. Although not shown in the illustrated example of FIG. 5, it may be appreciated that in additional or alternative examples, the base station 502 may be in communication with one or more other base stations or UEs, and/or the UE 504 may be in communication with one or more other base stations or UEs.

Although the following description provides examples of frequency hopping directed to instances including two hopping regions, the concepts described herein may be applicable to any suitable quantity of hopping regions. For example, the concepts described herein may be applicable to the three example hopping regions 402, 404, 406 of FIG. 4.

In the illustrated example of FIG. 5, the base station 502 may transmit a configuration message 510 that is received by the UE 504. The configuration message 510 may indicate at least one of a TCI state or a spatial relation associated with a hopping region. For example, the configuration message 510 may configure the UE 504 to apply a first TCI state or a first spatial relation when operating in a first hopping region and to apply a second TCI state or a second spatial relation when operating in a second hopping region.

In some examples, the first TCI state or the first spatial relation and the second TCI state or the second spatial relation may be associated with the same TRP. In some examples, the first TCI state or the first spatial relation and the second TCI state or the second spatial relation may be associated with different TRPs having the same PCI. In some examples, the first TCI state or the first spatial relation and the second TCI state or the second spatial relation may be associated with different TRPs having different PCIs.

In some examples in which the reduced capability UE is capable of supporting multiple TCIs, the reduced capability UE may apply different rulings per TCI state or for both TCI states.

The base station 502 may transmit the configuration message 510 using RRC signaling, DCI, and/or a MAC-CE. For example, an initial configuration of the parameters may be provided in RRC signaling, and the parameters may be enabled, disabled, activated, deactivated, and/or modified in DCI or a MAC-CE. Thus, parameters may be provided to the UE 504 in a semi-static manner and applied or adjusted based on dynamic signaling from the base station 502.

In some examples, the UE 504 may receive the configuration message 510 via a MAC-CE that activates multiple sets of multiple TCI states or spatial relations. In some such examples, each set may be associated with a respective hopping region or a set of BWPs. In some examples, one of the TCI states or spatial relations associated with a set may be designated a default TCI state or a default spatial relation. For example, the first TCI state or the first spatial relation may be designated the default TCI state or the default spatial relation.

In some examples, the configuration message 510 may applicable to a specific UE (e.g., the UE 504). In some examples, the configuration message 510 may applicable to a group of UEs including the UE 504.

In some examples, the TCI state and/or spatial relation indicated in the configuration message 510 may include a default TCI state or a default spatial relation associated with an anchor BWP.

In the illustrated example, the UE 504 and the base station 502 communicate 520 using a first hopping region. For example, the UE 504 may communicate using the first frequency hop 410 of FIG. 4. In some examples, the UE 504 may communicate with the base station 502 using the first hopping region by applying the first TCI state associated with the first hopping region to receive downlink messages from the base station 502. Additionally, or alternatively, the UE 504 may communicate with the base station 502 using the first hopping region by applying the first spatial relation associated with the first hopping region to transmit uplink messages to the base station 502. In some examples, the UE 504 may communicate using the first hopping region for at least one of downlink channels, uplink channels, or messages in the first hopping region. In some examples, the UE 504 may communicate using the first hopping region for at least one of a specific downlink channel, a specific uplink channel, or a specific message in the first hopping region.

At 530, the UE 504 may determine to switch to a second hopping region. In some examples, the determination to switch to the second hopping region may be triggered (e.g., via signaling from the base station 502).

At 540, the UE 504 determines at least one of a TCI state or a spatial relation for communicating using the second hopping region. In some examples, the UE 504 may determine the at least one of the TCI state or the spatial relation based on the configuration message 510. For example, the UE 504 may determine to use the second TCI state or the second spatial relation associated with the second hopping region.

In some examples, the UE 504 may determine that the TCI states and/or spatial relations associated with the second hopping region may be non-activated. In some examples, the UE 504 may use the current (or old) TCI state and/or spatial relation (e.g., the first TCI state or the first spatial relation) for the second hopping region. In some examples, the UE 504 may use a default TCI state and/or a default spatial relation for the second hopping region. In some examples, the UE 504 may use the TCI states and/or spatial relations associated with the second hopping region (e.g., an implicit activation of the TCI state or the spatial relation).

In some examples, the UE 504 may determine that a frequency hop overlaps with the first hopping region and the second hopping region (e.g., such as the fifth frequency hop 426 of FIG. 4). In some examples, the UE 504 may determine to use a default TCI state or a default spatial relation at the frequency hop. For example, when operating at the fifth frequency hop 426, the UE 504 may apply a default TCI state or a default spatial relation associated with SSB, CSI-RS, etc. In some examples, the UE 504 may determine to split the frequency hop into N regions covering the N TCI states or spatial relations. For example, as the fifth frequency hop 426 is associated with two TCI states, the UE 504 may determine to split the fifth frequency hop 426 into two regions that correspond to the two TCI states. In some examples, the UE 504 may determine to use the TCI state or the spatial relation for the hopping region with the most frequency overlap. For example, as shown in FIG. 4, the UE 504 may determine to use the second TCI state or the second spatial relation associated with the second hopping region when the first portion 428 is larger than the second portion 430 (e.g., the fifth frequency hop 426 has greater overlap with the second hopping region 404). The UE 504 may determine to use the first TCI state or the first TCI state associated with the first hopping region when the second portion 430 is larger than the first portion 428 (e.g., the fifth frequency hop 426 has greater overlap with the first hopping region 402).

In the illustrated example, the base station 502 may transmit a wideband TRS 545 that is received by the UE 504. Aspects of the wideband TRS 545 may be similar to the wideband TRS 450 of FIG. 4. For example, the base station 502 may configure the wideband TRS 545 so that the UE 504 is able to track the wideband TRS 545 across BWPs (e.g., from the first hopping region to a second hopping region).

At 550, the UE 504 may track the wideband TRS 545 across hopping regions. For example, the UE 504 may track the wideband TRS 545 across the first hopping region and the second hopping region. In some examples, tracking the wideband TRS 545 may include determining that a wideband TRS is activated to be tracked in a first set of BWPs associated with the first hopping region, and is configured to be within the first set of BWPs and a second set of BWPs associated with the second hopping region. For example, and referring to the example of FIG. 4, while communicating using the first hopping region 402, the UE 504 may determine that the wideband TRS 450 is activated to be tracked in the first hopping region 402 and is configured to be within the first hopping region 402 and the second hopping region 404. The UE 504 may then start tracking the first and second TCI states 412b at the second time T2 of FIG. 4. By tracking the wideband TRS 545 across the two hopping regions, the UE 504 may begin preparing for the beam switch before performing the frequency hop and, thus, reducing (or eliminating) the delays associated with when the UE 504 is capable of communicating using the determined at least one of the TCI state or the spatial relation (e.g., at 540).

At 560, the UE 504 may perform a frequency hop from a first frequency hop to a second frequency hop. For example, the UE 504 may perform a frequency hop from the first frequency hop 410 to the second frequency hop 414 of FIG. 4. Although this example is described for hopping between BWPs, aspects may also be applied to hopping between hop regions within a BWP. In some examples, the UE 504 may perform the frequency hopping in a variety of circumstances, such as based on one or more hopping schemes for the UE (e.g., the example frequency hopping pattern 400 of FIG. 4). The UE 504 may perform frequency hopping to increase diversity of uplink and/or downlink transmission.

In the illustrated example, the UE 504 and the base station 502 communicate 570 using the second hopping region. For example, the UE 504 may communicate using the second frequency hop 414 of FIG. 4. In some examples, the UE 504 may communicate with the base station 502 using the second hopping region by applying the second TCI state associated with the second hopping region to receive downlink messages from the base station 502. Additionally, or alternatively, the UE 504 may communicate with the base station 502 using the second hopping region by applying the second spatial relation associated with the second hopping region to transmit uplink messages to the base station 502. In some examples, the UE 504 may communicate using the second hopping region for at least one of downlink channels, uplink channels, or messages in the second hopping region. In some examples, the UE 504 may communicate using the second hopping region for at least one of a specific downlink channel, a specific uplink channel, or a specific message in the second hopping region.

Figure 6:
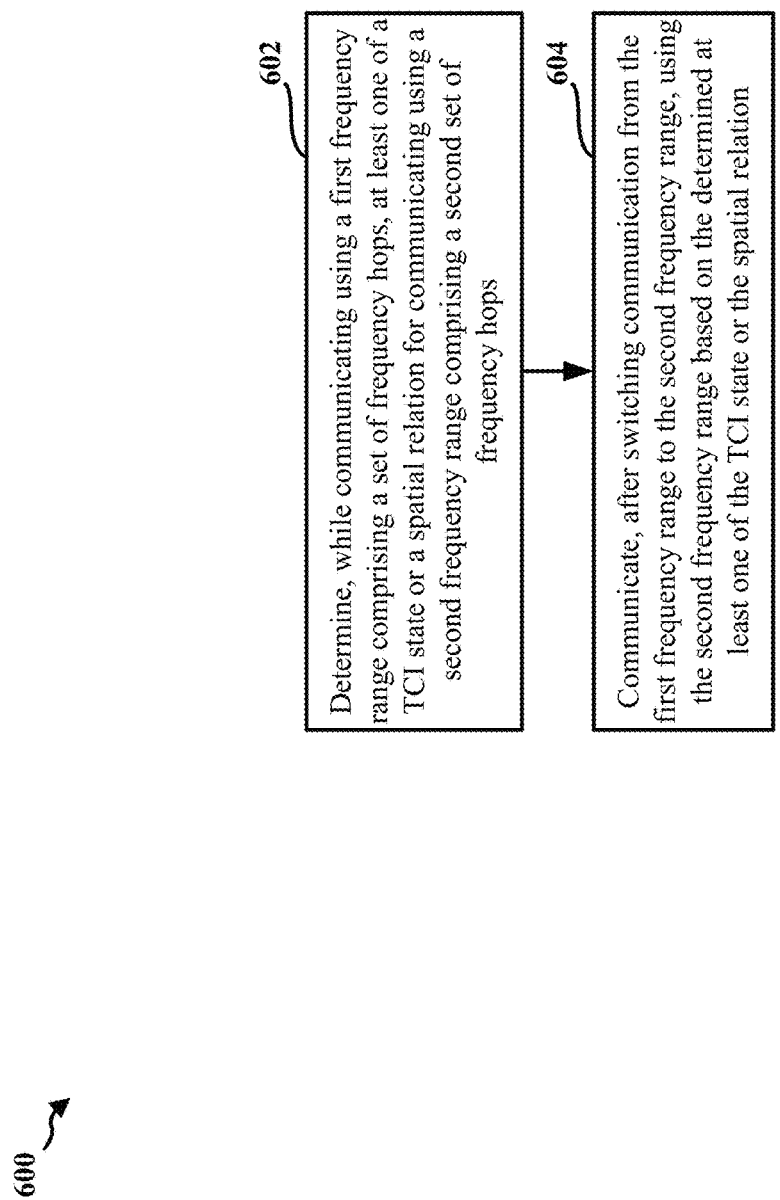
FIG. 6 is a flowchart of a method of wireless communication at a UE, in accordance with the teachings disclosed herein.

FIG. 6 is a flowchart 600 of a method of wireless communication. The method may be performed by a UE (e.g., the UE 104, the UE 350, and/or an apparatus 802 of FIG. 8). The method may enable a UE (e.g., a reduced capability UE) to apply different TCI states and/or spatial relations when operating within respective hopping regions (or frequency ranges).

At 602, the UE may determine, while communicating using a first frequency range, at least one of a TCI state or a spatial relation for communication using a second frequency range, as described above in connection with 540 of FIG. 5. For example, the determining of the at least one of the TCI state or the spatial relation for communication using the second frequency range may be performed by a determination component 842 of the apparatus 802 of FIG. 8. In some examples, the first frequency range includes a first hopping region associated with a first set of BWPs, and the second frequency range includes a second hopping region associated with a second set of BWPs.

The first frequency range may be associated with a first set of frequency hops and the second frequency range may be associated with a second set of frequency hops. In some examples, the second frequency range may be associated with an anchor frequency hop included in the second set of frequency hops, the anchor frequency hop may be associated with at least one of a default TCI state or a default spatial relation, and the determined at least one of the TCI state or the spatial relation may be based on the at least one of the default TCI state or the default spatial relation.

In some examples, the first frequency range may be associated with at least one of a second TCI state or a second spatial relation, and where the at least one of the TCI state or the spatial relation and the at least one of the second TCI state or the second spatial relation may be associated with a same TRP. In some examples, the first frequency range may be associated with at least one of a second TCI state or a second spatial relation, and where the at least one of the TCI state or the spatial relation and the at least one of the second TCI state or the second spatial relation may be associated with different TRPs with a same PCI. In some examples, the first frequency range may be associated with at least one of a second TCI state or a second spatial relation, and where the at least one of the TCI state or the spatial relation and the at least one of the second TCI state or the second spatial relation may be associated with different TRPs with different PCIs.

In some examples, the second frequency range may be associated with a non-activated TCI state or a non-activated spatial relation. In some such examples, the UE may determine the at least one of the TCI state or the spatial relation based on at least one of a second TCI state or a second spatial relation associated with the first frequency range. In some examples, the UE may determine the at least one of the TCI state or the spatial relation based on at least one of a default TCI state or a default spatial relation associated with the second frequency range. In some examples, the UE may determine the at least one of the TCI state or the spatial relation based on the non-activated TCI state or the non-activated spatial relation (e.g., an implicit activation of the TCI state or the spatial relation).

At 604, the UE may communicate, after switching communication from the first frequency range to the second frequency range, using the second frequency range based on the determined at least one of the TCI state or the spatial relation, as described above in connection with 570 of FIG. 5. For example, the communicating using second frequency range may be performed by a communication component 850 of the apparatus 802 of FIG. 8. In some examples, the communication using the second frequency range may be associated with at least one of downlink channels, uplink channels, or messages in the second set of frequency hops. In some examples, the communication using the second frequency range may be associated with at least one of a specific downlink channel, a specific uplink channel, or a specific message in the second set of frequency hops.

Figure 7:
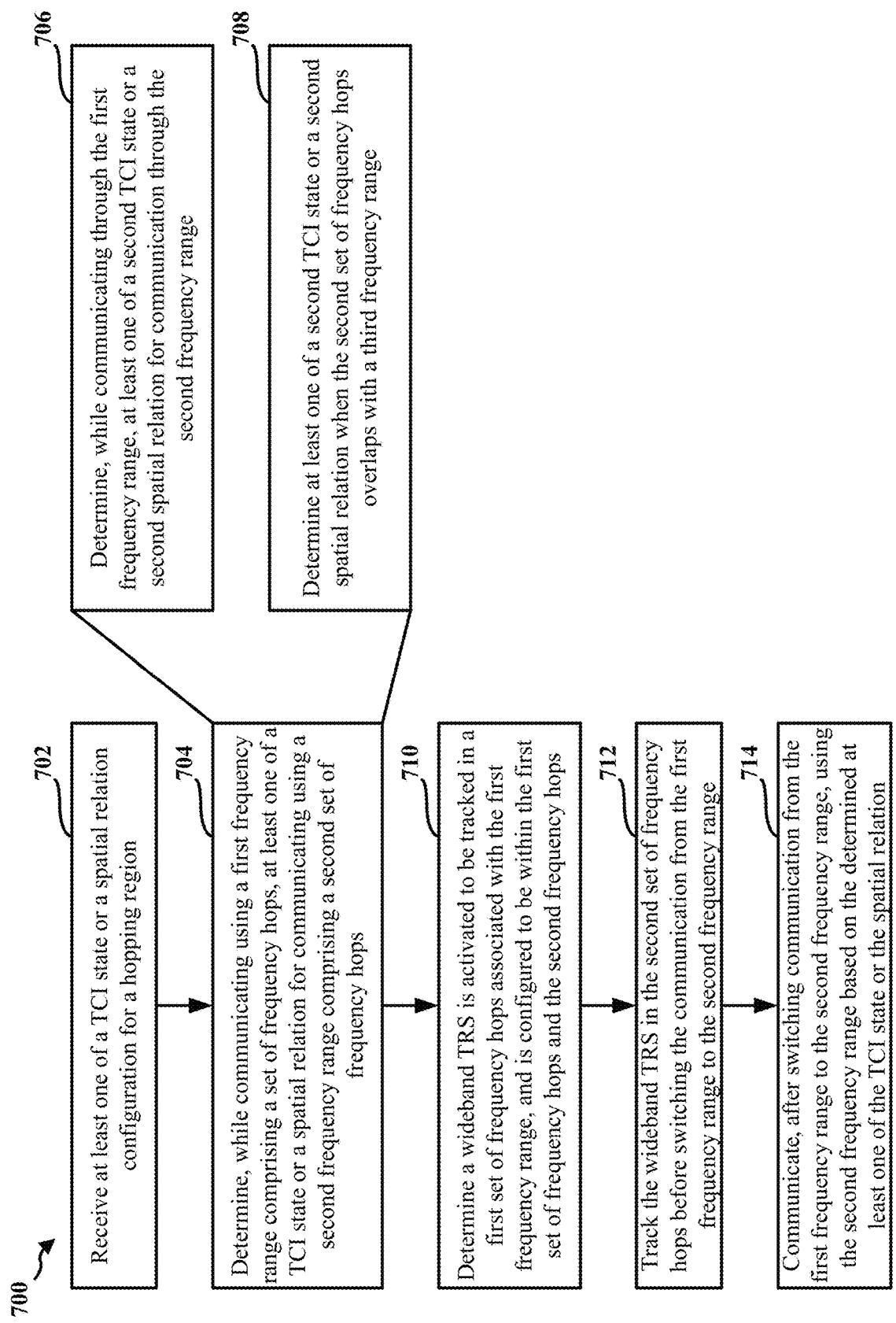
FIG. 7 is a flowchart of a method of wireless communication at a UE, in accordance with the teachings disclosed herein.

FIG. 7 is a flowchart 700 of a method of wireless communication. The method may be performed by a UE (e.g., the UE 104, the UE 350, and/or an apparatus 802 of FIG. 8). The method may enable a UE (e.g., a reduced capability UE) to apply different TCI states and/or spatial relations when operating within respective hopping regions (or frequency ranges).

At 702, the UE may receive a configuration including at least one of a TCI state or a spatial relation for a frequency range, as described above in connection with configuration message 510 of FIG. 5. For example, the receiving of the configuration including the at least one of the TCI state or the spatial relation may be performed by a reception component 830 and/or a configuration component 840 of the apparatus 802 of FIG. 8.

In some examples, the UE may receive the configuration through RRC signaling, DCI, or a MAC-CE. In some examples, the UE may receive the configuration through a MAC-CE activating a set of TCI states or spatial relations applicable to a plurality of frequency ranges including a first frequency range and a frequency range, or applicable to a plurality of frequency hops including a first set of frequency hops associated with the first frequency range and a second set of frequency hops associated with the second frequency range. In some examples, the configuration may be applicable to a specific UE (e.g., the UE 504 of FIG. 5). In some examples, the configuration may be applicable to a group of UEs including the UE (e.g., a group of UEs including the UE 504 of FIG. 5).

At 704, the UE may determine, while communicating using a first frequency range, at least one of a TCI state or a spatial relation for communication using a second frequency range, as described above in connection with 540 of FIG. 5. For example, the determining of the at least one of the TCI state or the spatial relation for communication using the second frequency range may be performed by a determination component 842 of the apparatus 802 of FIG. 8. In some examples, the first frequency range includes a first hopping region associated with a first set of BWPs, and the second frequency range includes a second hopping region associated with a second set of BWPs.

The first frequency range may be associated with a first set of frequency hops and the second frequency range may be associated with a second set of frequency hops. In some examples, the second frequency range may be associated with an anchor frequency hop included in the second set of frequency hops, the anchor frequency hop may be associated with at least one of a default TCI state or a default spatial relation, and the determined at least one of the TCI state or the spatial relation may be based on the at least one of the default TCI state or the default spatial relation.

In some examples, the first frequency range may be associated with at least one of a second TCI state or a second spatial relation, and where the at least one of the TCI state or the spatial relation and the at least one of the second TCI state or the second spatial relation may be associated with a same TRP. In some examples, the first frequency range may be associated with at least one of a second TCI state or a second spatial relation, and where the at least one of the TCI state or the spatial relation and the at least one of the second TCI state or the second spatial relation may be associated with different TRPs with a same PCI. In some examples, the first frequency range may be associated with at least one of a second TCI state or a second spatial relation, and where the at least one of the TCI state or the spatial relation and the at least one of the second TCI state or the second spatial relation may be associated with different TRPs with different PCIs.

In some examples, the second frequency range may be associated with a non-activated TCI state or a non-activated spatial relation. In some such examples, the UE may determine the at least one of the TCI state or the spatial relation based on at least one of a second TCI state or a second spatial relation associated with the first frequency range. In some examples, the UE may determine the at least one of the TCI state or the spatial relation based on at least one of a default TCI state or a default spatial relation associated with the second frequency range. In some examples, the UE may determine the at least one of the TCI state or the spatial relation based on the non-activated TCI state or the non-activated spatial relation (e.g., an implicit activation of the TCI state or the spatial relation).

In some examples, the UE may be configured to support multiple TCI states. For example, the UE may be configured to support two TCI states to receive PDSCH. At 706, the UE may determine, while communicating using the first frequency range associated with the first set of frequency hops, at least one of a second TCI state or a second spatial relation for communication using the second frequency range associated with the second set of frequency hops, as described above in connection with 540 of FIG. 5. For example, the determining of the at least one of the second TCI state or the second spatial relation may be performed by a second TCI state/spatial relation component 844 of the apparatus 802 of FIG. 8.

In some such examples, communicating using the second frequency range may be further based on the determined at least one of the second TCI state or the second spatial relation. In some examples, the at least one of the TCI state or the spatial relation may be determined differently than the at least one of the second TCI state or the second spatial relation. In some examples, the at least one of the TCI state or the spatial relation may be determined similarly to the at least one of the second TCI state or the second spatial relation.

In some examples, the UE may determine that the second set of frequency hops associated with the second frequency range is also within a third frequency range (e.g., as shown above in connection with the fifth frequency hop 426 of FIG. 4). In some such examples, the UE may determine, at 708, the at least one of the TCI state or the second spatial relation when the second set of frequency hops overlaps with a third frequency range, as described above in connection with 540 of FIG. 5. For example, the determining of the at least one of the TCI state or the spatial relation when the second set of frequency ranges overlaps with a third frequency range may be performed by an overlapping BWP component 846 of the apparatus 802 of FIG. 8.

In some examples, the UE may determine the least one of the TCI state or the spatial relation based on a default TCI state or a default spatial relation associated with the second frequency range and the third frequency range. In some examples, the UE may determine at least one of a second TCI state or a second spatial relation for communicating using the third frequency range based on the third frequency range, and where the at least one of the TCI state or the spatial relation is determined based on the second frequency range. In some examples, the UE may determine the at least one of the TCI state or the spatial relation based on the second frequency range when the second set of frequency hops has a greater overlap with the second frequency range than the third frequency range, and the UE may determine the at least one of the TCI state or the spatial relation based on the third frequency range when the second set of frequency has a greater overlap with the third frequency range than the second frequency range.

At 710, the UE may determine a wideband TRS is activated to be tracked in a first set of frequency hops associated with the first frequency range, and is configured to be within the first set of frequency hops and a second set of frequency hops associated with the second frequency range, as described above in connection with the wideband TRS 450 of FIG. 4 and/or the wideband TRS 545 of FIG. 5. For example, the determining that the wideband TRS is activated to be tracked in the first set of BWPs may be performed by a wideband TRS tracking component 848 of the apparatus 802 of FIG. 8.

At 712, the UE may track the wideband TRS in the second set of frequency hops before switching the communication from the first frequency range to the second frequency range, as described above in connection with 550 of FIG. 5. For example, the tracking of the wideband TRS may be performed by the wideband TRS tracking component 848 of the apparatus 802 of FIG. 8. In some examples, communication using the second frequency range may be further based on the tracked wideband TRS in the second set of frequency hops.

At 714, the UE may communicate, after switching communication from the first frequency range to the second frequency range, using the second frequency range based on the determined at least one of the TCI state or the spatial relation, as described above in connection with 570 of FIG. 5. For example, the communicating using second frequency range may be performed by a communication component 850 of the apparatus 802 of FIG. 8. In some examples, the communication using the second frequency range may be associated with at least one of downlink channels, uplink channels, or messages in the second set of frequency hops. In some examples, the communication using the second frequency range may be associated with at least one of a specific downlink channel, a specific uplink channel, or a specific message in the second set of frequency hops.

Figure 8:
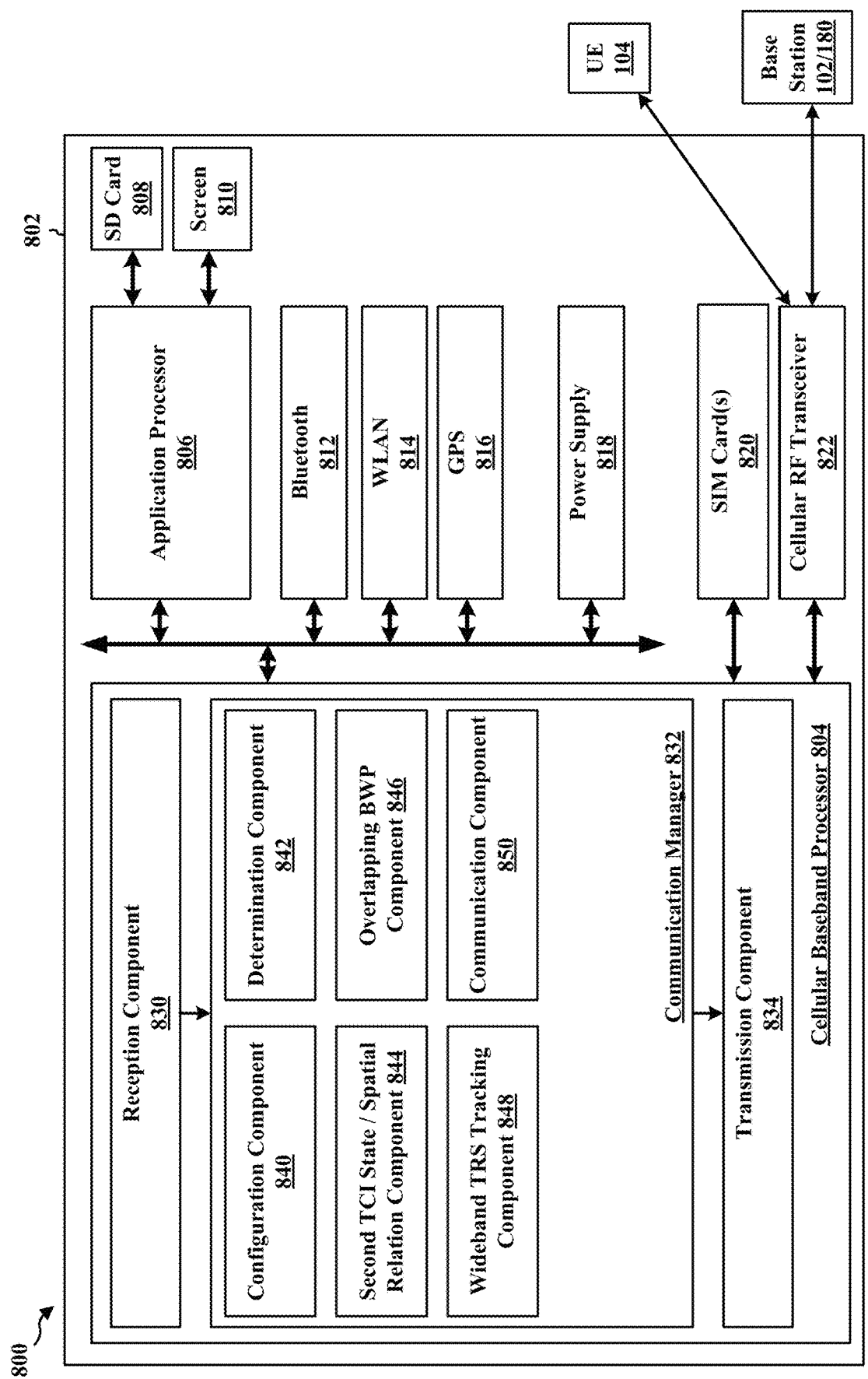
FIG. 8 is a diagram illustrating an example of a hardware implementation for an example apparatus, in accordance with the teachings disclosed herein.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus

802 may be the entire UE (e.g., see the UE 350 of FIG. 3) and include the additional modules of the apparatus 802.

The communication manager 832 includes a configuration component 840 that is configured to receive at least one of a TCI state or a spatial relation configuration for a hopping region, for example, as described in connection with 702 of FIG. 7.

The communication manager 832 also includes a determination component 842 that is configured to determine, while communicating using a first frequency range including a set of frequency hops, at least one of a TCI state or a spatial relation for communicating using a second frequency range including a second set of frequency hops, for example, as described in connection with 602 of FIG. 6 and/or 704 of FIG. 7.

The communication manager 832 also includes a second TCI state/spatial relation component 844 that is configured to determine, while communicating through the first frequency range, at least one of a second TCI state or a second spatial relation for communication through the second frequency range, for example, as described in connection with 706 of FIG. 7.

The communication manager 832 also includes an overlapping BWP component 846 that is configured to determine at least one of a second TCI state or a second spatial relation when the second set of frequency hops overlaps with a third frequency range, for example, as described in connection with 708 of FIG. 7.

The communication manager 832 also includes a wideband TRS tracking component 848 that is configured to determine a wideband TRS is activated to be tracked in a first set of frequency hops associated with the first frequency range, and is configured to be within the first set of frequency hops and the second frequency hops, for example, as described in connection with 710 of FIG. 7. The example wideband TRS tracking component 848 may also be configured to track the wideband TRS in the second set of frequency hops before switching the communication from the first frequency range to the second frequency range, for example, as described in connection with 712 of FIG. 7.

The communication manager 832 also includes a communication component 850 that is configured to communicate, after switching communication from the first frequency range to the second frequency range, using the second frequency range based on the determined at least one of the TCI state or the spatial relation, for example, as described in connection with 604 of FIG. 6 and/or 714 of FIG. 7.

The apparatus may include additional components that perform each of the blocks of the algorithm in the flowcharts of FIGS. 6 and/or 7. As such, each block in the flowcharts of FIGS. 6 and/or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for determining, while communicating using a first frequency range including a set of frequency hops, at least one of a TCI state or a spatial relation for communicating using a second frequency range including a second set of frequency hops. The example apparatus 802 also includes means for communicating, after switching communication from the first frequency range to the second frequency range, using the second frequency range based on the determined at least one of the TCI state or the spatial relation.

In another configuration, the example apparatus 802 also includes means for receiving at least one of a TCI state or a spatial relation configuration for a hopping region.

In another configuration, the example apparatus 802 also includes means for determining, while communicating through the first frequency range, at least one of a second TCI state or a second spatial relation for communication through the second frequency range.

In another configuration, the example apparatus 802 also includes means for determining at least one of a second TCI state or a second spatial relation when the second set of frequency hops overlaps with a third frequency range.

In another configuration, the example apparatus 802 also includes means for determining a wideband TRS is activated to be tracked in a first set of frequency hops associated with the first frequency range, and is configured to be within the first set of frequency hops and the second frequency hops.

In another configuration, the example apparatus 802 also includes means for tracking the wideband TRS in the second set of frequency hops before switching the communication from the first frequency range to the second frequency range.

The means may be one or more of the components of the apparatus 802 configured to perform the functions recited by the means. As described supra, the apparatus 802 may include the TX processor 368, the RX processor 356, and the controller/processor 359. As such, in one configuration, the means may be the TX processor 368, the RX processor 356, and the controller/processos 359 configured to perform the functions recited by the means.

Figure 9:
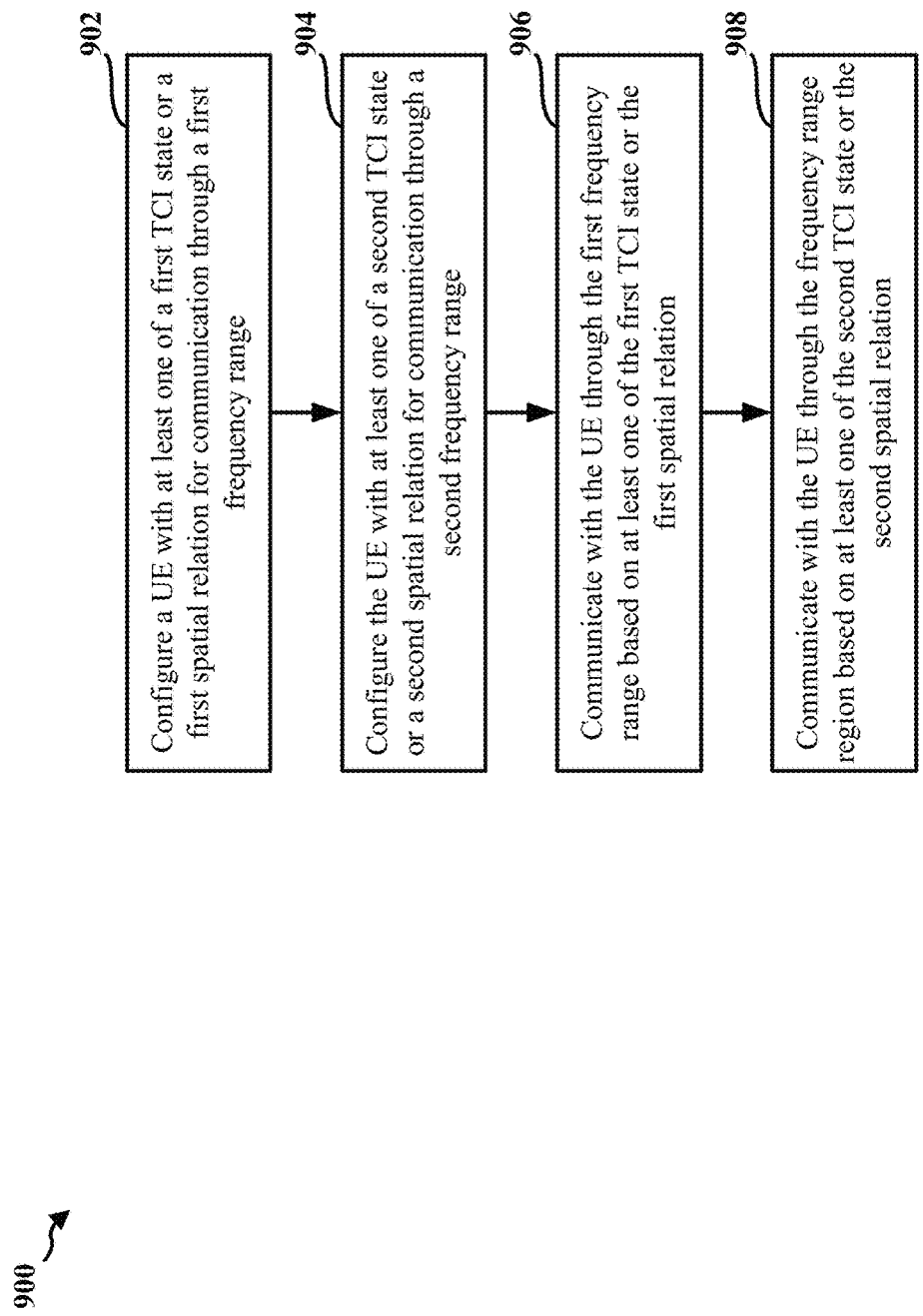
FIG. 9 is a flowchart of a method of wireless communication at a base station, in accordance with the teachings disclosed herein.

FIG. 9 is a flowchart 900 of a method of wireless communication. The method may be performed by a base station (e.g., the base station 102/180, the base station 310, and/or an apparatus 1102 of FIG. 11). The method may improve the efficient exchange of communication between a base station and a UE based on application of different sets of parameters when communicating in respective hopping regions.

At 902, the base station configures a UE with at least one of a first TCI state or a first spatial relation for communication using a first frequency range associated with a first set of frequency hops, as described above in connection with the configuration message 510 of FIG. 5. For example, the configuring of the UE for communication using the first frequency range, at 902, may be performed by a configuration component 1140 of the apparatus 1102 of FIG. 11.

At 904, the base station configures the UE with at least one of a second TCI state or a second spatial relation for communication using a second frequency range associated with a second set of frequency hops, as described above in connection with the configuration message 510 of FIG. 5. For example, the configuring of the UE for communication using the second frequency range, at 904, may be performed by the configuration component 1140 of the apparatus 1102 of FIG. 11.

In some examples, the configuring of the UE for communicating using the first frequency range and using the second frequency range is indicated through at least one of RRC signaling, DCI, or a MAC-CE. In some examples, the configuring of the UE for communicating using the first frequency range and using the second frequency range is indicated through a MAC-CE activating a set of TCI states or spatial relations applicable to a plurality of frequency ranges including the first frequency range and the second frequency range, or applicable to a plurality of frequency hops including the first set of frequency hops and the second set of frequency hops.

In some examples, the at least one of the first TCI state or the first spatial relation and the at least one of the second TCI state or the second spatial relation may be associated with a same TRP. In some examples, the at least one of the first TCI state or the first spatial relation and the at least one of the second TCI state or the second spatial relation may be associated with different TRPs with a same PCI. In some examples, the at least one of the first TCI state or the first spatial relation and the at least one of the second TCI state or the second spatial relation may be associated with different TRPs with different PCIs.

In some examples, the at least one of the first TCI state or the first spatial relation and the at least one of the second TCI state or the second spatial relation may be associated with a specific UE, the specific UE being the UE. In some examples, the at least one of the first TCI state or the first spatial relation and the at least one of the second TCI state or the second spatial relation may be associated with a group of UEs including the UE.

At 906, the base station communicates with the UE using the first frequency range based on at least one of the first TCI state or the first spatial relation, as described above in connection with the communication 520 of FIG. 5. For example, the communicating with the UE using the first frequency range, at 906, may be performed by a communication component 1142 of the apparatus 1102 of FIG. 11.

At 908, the base station communicates, after switching communication from the first frequency range to the second frequency range, with the UE using the second frequency range based on at least one of the second TCI state or the second spatial relation, as described above in connection with the communication 570 of FIG. 5. For example, the communicating with the UE using the first frequency range, at 908, may be performed by a communication component 1142 of the apparatus 1102 of FIG. 11.

In some examples, the second frequency range may be associated with an anchor frequency hop included in the second set of frequency hops. In some examples, the anchor frequency hop may be associated with at least one of a default TCI state or a default spatial relation, and at least one of the second TCI state or the second spatial relation may be based on the at least one of the default TCI state or the default spatial relation.

In some examples, communicating using the second frequency range may be further based on at least one of a third TCI state or a third spatial relation associated with the second frequency range. In some examples, the at least one of the second TCI state or the second spatial relation may be determined differently than the at least one of the third TCI state or the third spatial relation. In some examples, the at least one of the second TCI state or the second spatial relation may be determined similarly to the at least one of the third TCI state or the third spatial relation.

In some examples, the second frequency range may be associated with a non-activated TCI state or a non-activated spatial relation. In some examples, the base station may communicate using the second frequency range based on at least one of the first TCI state or the first spatial relation associated with the first frequency range. In some examples, the base station may communicate using the second frequency range based on at least one of a default TCI state or a default spatial relation associated with the second frequency range. In some examples, the base station may communicate using the second frequency range based on the non-activated TCI state or the non-activated spatial relation (e.g., an implicit activation of the TCI state or the spatial relation).

In some examples, the communication using the second frequency range may be associated with at least one of downlink channels, uplink channels, or messages in the second set of frequency hops. In some examples, the communication using the second frequency range may be associated with at least one of a specific downlink channel, a specific uplink channel, or a specific message in the second set of frequency hops.

In some examples, the second set of frequency hops may also be within a third frequency range (e.g., as shown above in connection with the fifth frequency hop 426 of FIG. 4). In some examples, the base station may communicate using the second set of frequency hops based on a default TCI state or a default spatial relation associated with the second frequency range and the third frequency range. In some examples, the base station may communicate using the second set of frequency hops based on at least one of a third TCI state or a third spatial relation for communicating using the third frequency range based on the third frequency range. In some examples, the base station may communicate using the second set of frequency hops based on the second frequency range when the second set of frequency hops has a greater overlap with the second frequency range than the third frequency range, and based on the third frequency range when the second set of frequency hops has a greater overlap with the third frequency range than the second frequency range.

Figure 10:
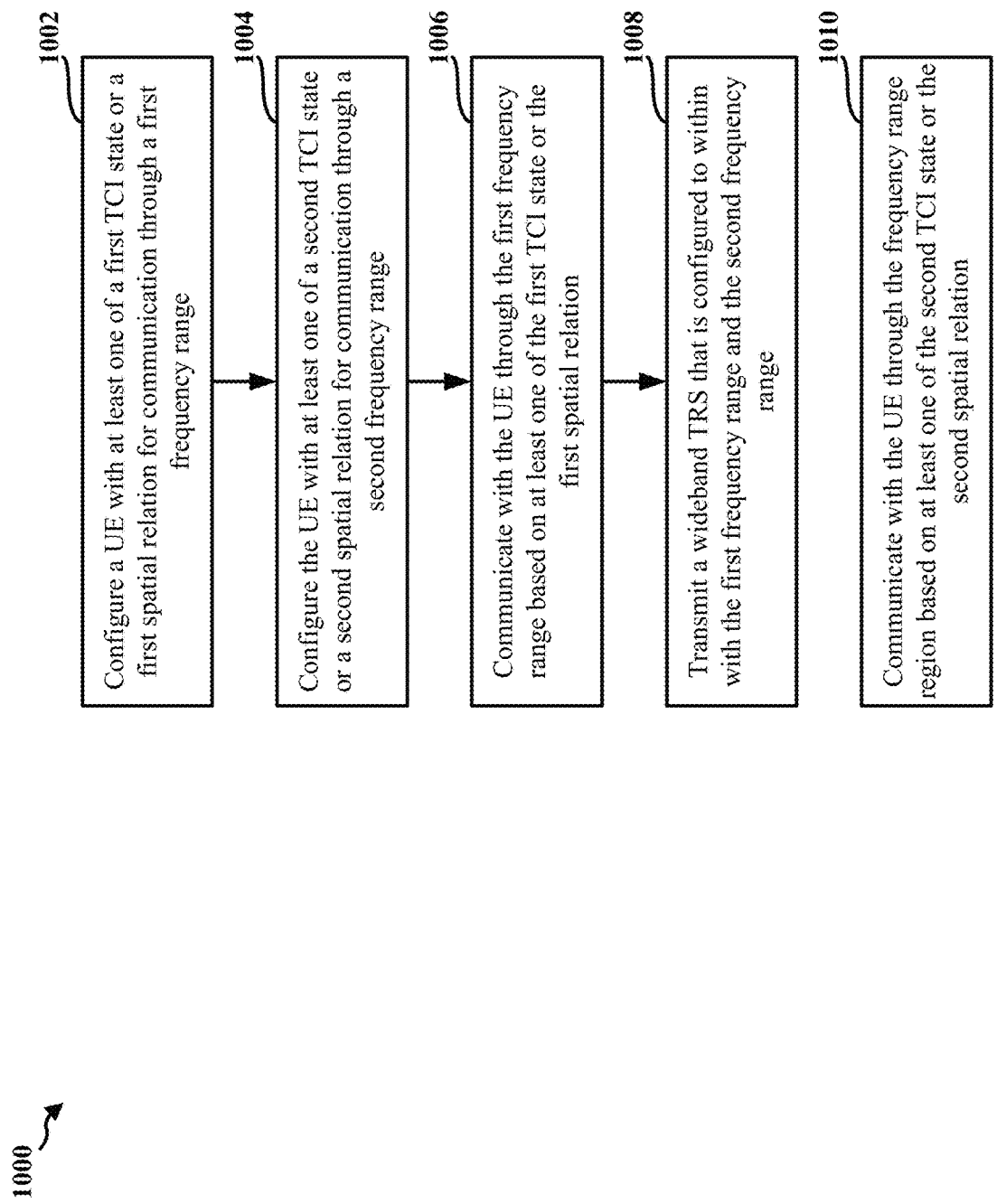
FIG. 10 is a flowchart of a method of wireless communication at a base station, in accordance with the teachings disclosed herein.

FIG. 10 is a flowchart 1000 of a method of wireless communication. The method may be performed by a base station (e.g., the base station 102/180, the base station 310, and/or an apparatus 1102 of FIG. 11). The method may improve the efficient exchange of communication between a base station and a UE based on application of different sets of parameters when communicating in respective hopping regions.

At 1002, the base station configures a UE with at least one of a first TCI state or a first spatial relation for communication using a first frequency range associated with a first set of frequency hops, as described above in connection with the configuration message 510 of FIG. 5. For example, the configuring of the UE for communication using the first frequency range, at 1002, may be performed by a configuration component 1140 of the apparatus 1102 of FIG. 11.

At 1004, the base station configures the UE with at least one of a second TCI state or a second spatial relation for communication using a second frequency range associated with a second set of frequency hops, as described above in connection with the configuration message 510 of FIG. 5. For example, the configuring of the UE for communication using the second frequency range, at 1004, may be performed by the configuration component 1140 of the apparatus 1102 of FIG. 11.

In some examples, the configuring of the UE for communicating using the first frequency range and using the second frequency range is indicated through at least one of RRC signaling, DCI, or a MAC-CE. In some examples, the configuring of the UE for communicating using the first frequency range and using the second frequency range is indicated through a MAC-CE activating a set of TCI states or spatial relations applicable to a plurality of frequency ranges including the first frequency range and the second frequency range, or applicable to a plurality of frequency hops including the first set of frequency hops and the second set of frequency hops.

In some examples, the at least one of the first TCI state or the first spatial relation and the at least one of the second TCI state or the second spatial relation may be associated with a same TRP. In some examples, the at least one of the first TCI state or the first spatial relation and the at least one of the second TCI state or the second spatial relation may be associated with different TRPs with a same PCI. In some examples, the at least one of the first TCI state or the first spatial relation and the at least one of the second TCI state or the second spatial relation may be associated with different TRPs with different PCIs.

In some examples, the at least one of the first TCI state or the first spatial relation and the at least one of the second TCI state or the second spatial relation may be associated with a specific UE, the specific UE being the UE. In some examples, the at least one of the first TCI state or the first spatial relation and the at least one of the second TCI state or the second spatial relation may be associated with a group of UEs including the UE.

At 1006, the base station communicates with the UE using the first frequency range based on at least one of the first TCI state or the first spatial relation, as described above in connection with the communication 520 of FIG. 5. For example, the communicating with the UE using the first frequency range, at 1006, may be performed by a communication component 1142 of the apparatus 1102 of FIG. 11.

At 1008, the base station may transmit, to the UE, a wideband TRS that is activated to be tracked in the first set of frequency hops, and is configured to be within the first set of frequency hops and the second set of frequency hops, as described above in connection with the wideband TRS 450 of FIG. 4 and/or the wideband TRS 545 of FIG. 5. For example, the transmitting of the wideband TRS, at 1008, may be performed by a wideband TRS component 1144 of the apparatus 1102 of FIG. 11. In some examples, communication using the second frequency range may be based on the wideband TRS in the second set of frequency hops.

In some examples, the communication using the first frequency range may be associated with at least one of downlink channels, uplink channels, or messages in the first set of frequency hops. In some examples, the communication using the first frequency range may be associated with at least one of a specific downlink channel, a specific uplink channel, or a specific message in the first set of frequency hops.

At 1010, the base station communicates, after switching communication from the first frequency range to the second frequency range, with the UE using the second frequency range based on at least one of the second TCI state or the second spatial relation, as described above in connection with the communication 570 of FIG. 5. For example, the communicating with the UE using the first frequency range, at 1010, may be performed by a communication component 1142 of the apparatus 1102 of FIG. 11.

In some examples, the second frequency range may be associated with an anchor frequency hop included in the second set of frequency hops. In some examples, the anchor frequency hop may be associated with at least one of a default TCI state or a default spatial relation, and at least one of the second TCI state or the second spatial relation may be based on the at least one of the default TCI state or the default spatial relation.

In some examples, communicating using the second frequency range may be further based on at least one of a third TCI state or a third spatial relation associated with the second frequency range. In some examples, the at least one of the first TCI state or the first spatial relation may be determined differently than the at least one of the third TCI state or the third spatial relation. In some examples, the at least one of the second TCI state or the second spatial relation may be determined similarly to the at least one of the third TCI state or the third spatial relation.

In some examples, the second frequency range may be associated with a non-activated TCI state or a non-activated spatial relation. In some examples, the base station may communicate using the second frequency range based on at least one of the first TCI state or the first spatial relation associated with the first frequency range. In some examples, the base station may communicate using the second frequency range based on at least one of a default TCI state or a default spatial relation associated with the second frequency range. In some examples, the base station may communicate using the second frequency range based on the non-activated TCI state or the non-activated spatial relation (e.g., an implicit activation of the TCI state or the spatial relation).

In some examples, the communication using the second frequency range may be associated with at least one of downlink channels, uplink channels, or messages in the second set of frequency hops. In some examples, the communication using the second frequency range may be associated with at least one of a specific downlink channel, a specific uplink channel, or a specific message in the second set of frequency hops.

In some examples, the second set of frequency hops may also be within a third frequency range (e.g., as shown above in connection with the fifth frequency hop 426 of FIG. 4). In some examples, the base station may communicate using the second set of frequency hops based on a default TCI state or a default spatial relation associated with the second frequency range and the third frequency range. In some examples, the base station may communicate using the second set of frequency hops based on at least one of a third TCI state or a third spatial relation for communicating using the third frequency range based on the third frequency range. In some examples, the base station may communicate using the second set of frequency hops based on the second frequency range when the second set of frequency hops has a greater overlap with the second frequency range than the third frequency range, and based on the third frequency range when the second set of frequency hops has a greater overlap with the third frequency range than the second frequency range.

Figure 11:
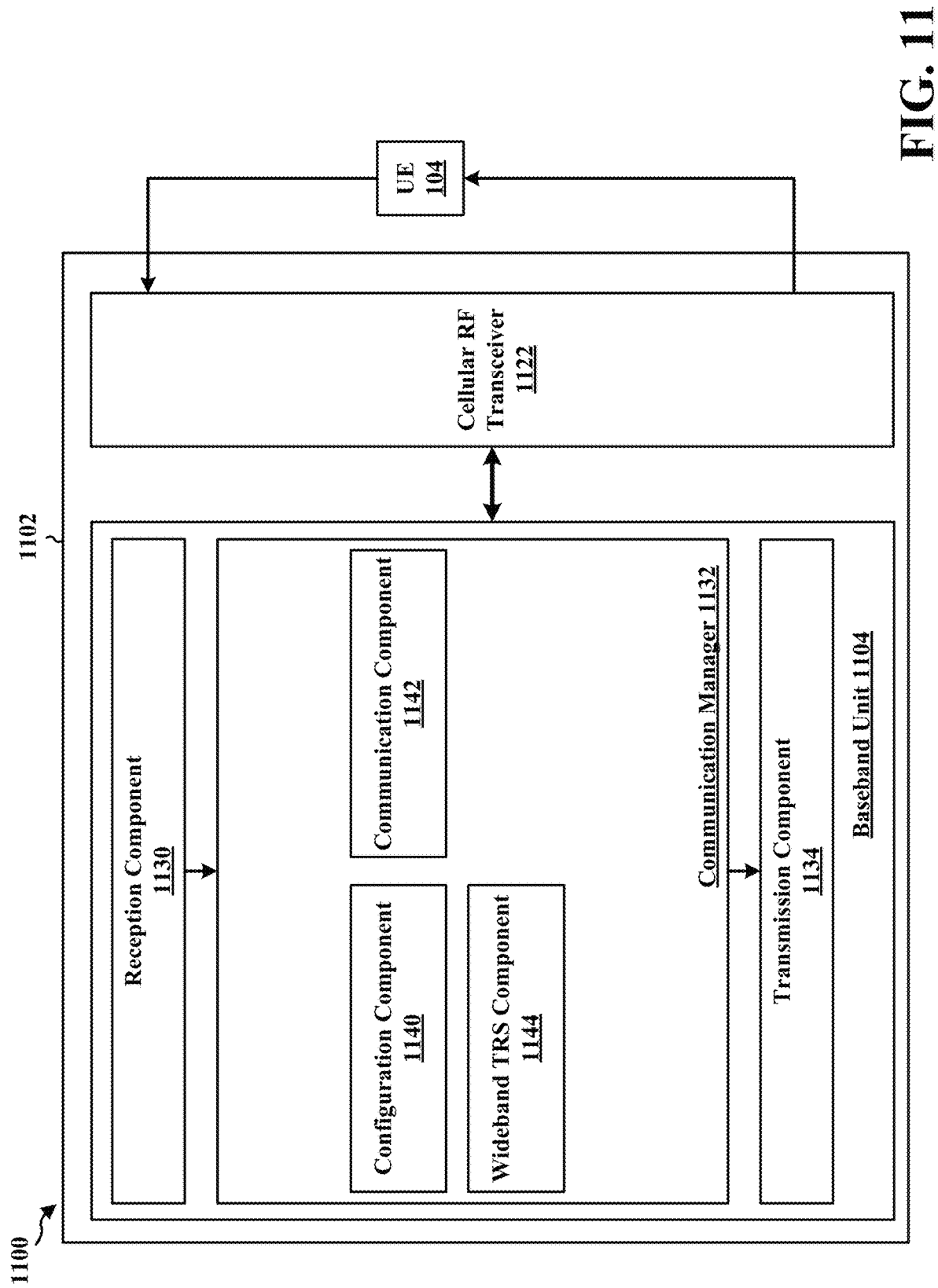
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a configuration component 1140 that is configured to configure a UE with at least one of a first TCI state or a first spatial relation for communication through a first frequency range, for example, as described in connection with 902 of FIG. 9 and/or 1002 of FIG. 10. The example configuration component 1140 may also be configured to configure the UE with at least one of a second TCI state or a second spatial relation for communication through a second frequency range, for example, as described in connection with 904 of FIG. 9 and/or 1004 of FIG. 10.

The communication manager 1132 also includes a communication component 1142 that is configured to communicate with the UE through the first frequency range based on at least one of the first TCI state or the first spatial relation, for example, as described in connection with 906 of FIG. 9 and/or 1006 of FIG. 10. The example communication component 1142 may also be configured to communicate with the UE through the frequency range region based on at least one of the second TCI state or the second spatial relation, for example, as described in connection with 908 of FIG. 9 and/or 1010 of FIG. 10.

The communication manager 1132 also includes a wideband TRS component 1144 that is configured to transmit a wideband TRS that is configured to within with the first frequency range and the second frequency range, for example, as described in connection with 1008 of FIG. 10.

The apparatus may include additional components that perform each of the blocks of the algorithm in the flowcharts of FIGS. 9 and/or 10. As such, each block in the flowcharts of FIGS. 9 and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for configuring a UE with at least one of a first TCI state or a first spatial relation for communication through a first frequency range. The example apparatus 1102 also includes means for configuring the UE with at least one of a second TCI state or a second spatial relation for communication through a second frequency range. The example apparatus 1102 also includes means for communicating with the UE through the first frequency range based on at least one of the first TCI state or the first spatial relation. The example apparatus 1102 also includes means for communicating with the UE through the frequency range region based on at least one of the second TCI state or the second spatial relation.

In another configuration, the example apparatus 1102 also includes means for transmitting a wideband TRS that is configured to within with the first frequency range and the second frequency range.

The means may be one or more of the components of the apparatus 1102 configured to perform the functions recited by the means. As described supra, the apparatus 1102 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if" "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to determine, while communicating using a first frequency range comprising a first set of frequency hops, at least one of a TCI state or a spatial relation for communicating using a second frequency range comprising a second set of frequency hops; and communicate, after switching communication from the first frequency range to the second frequency range, using the second frequency range based on the determined at least one of the TCI state or the spatial relation.

Aspect 2 is the apparatus of aspect 1, further including that the first frequency range comprises a first hopping region associated with a first set of BWPs, and the second frequency range comprises a second hopping region associated with a second set of BWPs.

Aspect 3 is the apparatus of any of aspects 1 and 2, further including that the second frequency range is associated with an anchor frequency hop included in the second set of frequency hops, the anchor frequency hop being associated with at least one of a default TCI state or a default spatial relation, and the determined at least one of the TCI state or the spatial relation being based on the at least one of the default TCI state or the default spatial relation.

Aspect 4 is the apparatus of any of aspects 1 to 3, further including that the at least one processor is further configured to: determine a wideband TRS is activated to be tracked in the first set of frequency hops, and is configured to be within the first set of frequency hops and the second set of frequency hops; and track the wideband TRS in the second set of frequency hops before switching the communication from the first frequency range to the second frequency range, where the communicating through the second frequency range is further based on the tracked wideband TRS in the second set of frequency hops.

Aspect 5 is the apparatus of any of aspects 1 to 4, further including that the first frequency range is associated with at least one of a second TCI state or a second spatial relation, and where the at least one of the TCI state or the spatial relation and the at least one of the second TCI state or the second spatial relation are associated with a same TRP.

Aspect 6 is the apparatus of any of aspects 1 to 4, further including that the first frequency range is associated with at least one of a second TCI state or a second spatial relation, and where the at least one of the TCI state or the spatial relation and the at least one of the second TCI state or the second spatial relation are associated with different TRPs with a same PCI.

Aspect 7 is the apparatus of any of aspects 1 to 4, further including that the first frequency range is associated with at least one of a second TCI state or a second spatial relation, and where the at least one of the TCI state or the spatial relation and the at least one of the second TCI state or the second spatial relation are associated with different TRPs with different PCIs.

Aspect 8 is the apparatus of any of aspects 1 to 7, further including that the at least one processor is further configured to: determine, while communicating through the first frequency range associated with the first set of frequency hops, at least one of a second TCI state or a second spatial relation for communicating through the second frequency range associated with the second set of frequency hops, where the communicating through the second frequency range is further based on the determined at least one of the second TCI state or the second spatial relation.

Aspect 9 is the apparatus of any of aspects 1 to 8, further including that the second frequency range is associated with a non-activated TCI state or a non-activated spatial relation, and the at least one of the TCI state or the spatial relation is determined based on at least one of a second TCI state or a second spatial relation associated with the first frequency range.

Aspect 10 is the apparatus of any of aspects 1 to 8, further including that the second frequency range is associated with a non-activated TCI state or a non-activated spatial relation, and the at least one of the TCI state or the spatial relation is determined based on at least one of a default TCI state or a default spatial relation associated with the second frequency range.

Aspect 11 is the apparatus of any of aspects 1 to 8, further including that the second frequency range is associated with a non-activated TCI state or a non-activated spatial relation, and the at least one of the TCI state or the spatial relation is determined based on the non-activated TCI state or the non-activated spatial relation.

Aspect 12 is the apparatus of any of aspects 1 to 11, further including that the determined at least one of the TCI state or the spatial relation is associated with a specific UE, the specific UE being the UE.

Aspect 13 is the apparatus of any of aspects 1 to 11, further including that the determined at least one of the TCI state or the spatial relation is associated with a group of UEs including the UE.

Aspect 14 is the apparatus of any of aspects 1 to 13, further including that the second set of frequency hops is also within a third frequency range, and the least one of the TCI state or the spatial relation being determined based on a default TCI state or a default spatial relation associated with the second frequency range and the third frequency range.

Aspect 15 is the apparatus of any of aspects 1 to 13, further including that the second set of frequency hops is also within a third frequency range, and the at least one processor is further configured to: determine at least one of a second TCI state or a second spatial relation for communicating through the third frequency range based on the third frequency range, where the at least one of the TCI state or the spatial relation is determined based on the second frequency range.

Aspect 16 is the apparatus of any of aspects 1 to 13, further including that the second set of frequency hops is also within a third frequency range, and the least one of the TCI state or the spatial relation is determined based on the second frequency range when the second set of frequency hops has a greater overlap with the second frequency range than the third frequency range, and is determined based on the third frequency range when the second set of frequency hops has the greater overlap with the third frequency range than the second frequency range.

Aspect 17 is the apparatus of any of aspects 1 to 16, further including that the determination of the at least one of the TCI state or the spatial relation is determined based on a MAC-CE activating a set of TCI states or spatial relations applicable to a plurality of frequency ranges including the first frequency range and the second frequency range, or applicable to a plurality of frequency hops including the first set of frequency hops and the second set of frequency hops.

Aspect 18 is the apparatus of any of aspects 1 to 17, further including that the UE comprises a reduced capability UE.

Aspect 19 is the apparatus of any of aspects 1 to 18, further including a transceiver coupled to the at least one processor.

Aspect 20 is a method of wireless communication for implementing any of aspects 1 to 19.

Aspect 21 is an apparatus for wireless communication including means for implementing any of aspects 1 to 19.

Aspect 22 is a non-transitory computer-readable storage medium storing computer executable code, where the code, when executed, causes a processor to implement any of aspects 1 to 19.

Aspect 23 is an apparatus for wireless communication at a base station including at least one processor coupled to a memory and configured to configure a UE with at least one of a first TCI state or a first spatial relation for communication through a first frequency range associated with a first set of frequency hops; configure the UE with at least one of a second TCI state or a second spatial relation for communication through a second frequency range associated with a second set of frequency hops; communicate with the UE through the first frequency range based on at least one of the first TCI state or the first spatial relation; and communicate, after switching communication from the first frequency range to the second frequency range, with the UE through the second frequency range based on at least one of the second TCI state or the second spatial relation.

Aspect 24 is the apparatus of aspect 23, further including that the first frequency range comprises a first hopping region associated with a first set of BWPs, and the second frequency range comprises a second hopping region associated with a second set of BWPs.

Aspect 25 is the apparatus of any of aspects 23 and 24, further including that the second frequency range is associated with an anchor frequency hop included in the second set of frequency hops, the anchor frequency hop being associated with at least one of a default TCI state or a default spatial relation, and at least one of the second TCI state or the second spatial relation being based on the at least one of the default TCI state or the default spatial relation.

Aspect 26 is the apparatus of any of aspects 23 to 25, further including that the at least one processor is further configured to: transmit, to the UE, a wideband TRS that is activated to be tracked in the first set of frequency hops, and is configured to be within the first set of frequency hops and the second set of frequency hops, wherein the communicating through the second frequency range is further based on the wideband TRS in the second set of frequency hops.

Aspect 27 is the apparatus of any of aspects 23 to 26, further including that the communicating through the second frequency range is further based on at least one of a third TCI state or a third spatial relation associated with the second frequency range.

Aspect 28 is the apparatus of any of aspects 23 to 27, further including that the second frequency range is associated with a non-activated TCI state or a non-activated spatial relation, and the communicating through the second frequency range is based on at least one of the first TCI state or the first spatial relation associated with the first frequency range.

Aspect 29 is the apparatus of any of aspects 23 to 27, further including that the second frequency range is associated with a non-activated TCI state or a non-activated spatial relation, and the communicating through the second frequency range is based on at least one of a default TCI state or a default spatial relation associated with the second frequency range.

Aspect 30 is the apparatus of any of aspects 23 to 27, further including that the second frequency range is associated with a non-activated TCI state or a non-activated spatial relation, and the communication through the second frequency range is based on the non-activated TCI state or the non-activated spatial relation.

Aspect 31 is the apparatus of any of aspects 23 to 30, further including a transceiver coupled to the at least one processor.

Aspect 32 is a method of wireless communication for implementing any of aspects 23 to 31.

Aspect 33 is an apparatus for wireless communication including means for implementing any of aspects 23 to 31.

Aspect 34 is a non-transitory computer-readable storage medium storing computer executable code, where the code, when executed, causes a processor to implement any of aspects 23 to 31.

Aspect 35 is an apparatus for wireless communication at a UE including at least one processor coupled to a memory and configured to determine, while communicating through a first hopping region associated with a first set of BWPs, at least one of a TCI state or a spatial relation for communication through a second hopping region associated with a second set of BWPs; and communicate, after switching communication from the first hopping region to the second hopping region, through the second hopping region based on the determined at least one of the TCI state or the spatial relation.

Aspect 36 is the apparatus of aspect 35, further including that the second hopping region is associated with an anchor BWP included in the second set of BWPs, the anchor BWP is associated with at least one of a default TCI state or a default spatial relation, and the determined at least one of the TCI state or the spatial relation is based on the at least one of the default TCI state or the default spatial relation.

Aspect 37 is the apparatus of any of aspects 35 and 36, further including that the at least one processor is further configured to: determine a wideband TRS is activated to be tracked in the first set of BWPs, and is configured to be within the first set of BWPs and the second set of BWPs; and track the wideband TRS in the second set of BWPs before switching the communication from the first hopping region to the second hopping region, where the communication through the second hopping region is further based on the tracked wideband TRS in the second set of BWPs.

Aspect 38 is the apparatus of any of aspects 35 to 37, further including that the first hopping region is associated with at least one of a second TCI state or a second spatial relation, and where the at least one of the TCI state or the spatial relation and the at least one of the second TCI state or the second spatial relation are associated with a same TRP.

Aspect 39 is the apparatus of any of aspects 35 to 38, further including that the first hopping region is associated with at least one of a second TCI state or a second spatial relation, and where the at least one of the TCI state or the spatial relation and the at least one of the second TCI state or the second spatial relation are associated with different TRPs with a same PCI.

Aspect 40 is the apparatus of any of aspects 35 to 38, further including that the first hopping region is associated with at least one of a second TCI state or a second spatial relation, and where the at least one of the TCI state or the spatial relation and the at least one of the second TCI state or the second spatial relation are associated with different TRPs with different PCIs.

Aspect 41 is the apparatus of any of aspects 35 to 40, further including that the at least one processor is further configured to: determine, while communicating through the first hopping region associated with the first set of BWPs, at least one of a second TCI state or a second spatial relation for communication through the second hopping region associated with the second set of BWPs, and where the communication through the second hopping region is further based on the determined at least one of the second TCI state or the second spatial relation.

Aspect 42 is the apparatus of any of aspects 35 to 41, further including that the at least one of the TCI state or the spatial relation is determined differently than the at least one of the second TCI state or the second spatial relation.

Aspect 43 is the apparatus of any of aspects 35 to 41, further including that the at least one of the TCI state or the spatial relation is determined similarly to the at least one of the second TCI state or the second spatial relation.

Aspect 44 is the apparatus of any of aspects 35 to 43, further including that the second hopping region is associated with a non-activated TCI state or a non-activated spatial relation, and the at least one of the TCI state or the spatial relation is determined based on at least one of a second TCI state or a second spatial relation associated with the first hopping region.

Aspect 45 is the apparatus of any of aspects 35 to 43, further including that the second hopping region is associated with a non-activated TCI state or a non-activated spatial relation, and the at least one of the TCI state or the spatial relation is determined based on at least one of a default TCI state or a default spatial relation associated with the second hopping region.

Aspect 46 is the apparatus of any of aspects 35 to 43, further including that the second hopping region is associated with a non-activated TCI state or a non-activated spatial relation, and the at least one of the TCI state or the spatial relation is determined based on the non-activated TCI state or the non-activated spatial relation.

Aspect 47 is the apparatus of any of aspects 35 to 46, further including that the communication through the second hopping region is associated with at least one of downlink channels, uplink channels, or messages in the second set of BWPs.

Aspect 48 is the apparatus of any of aspects 35 to 47, further including that the communication through the second hopping region is associated with at least one of a specific downlink channel, a specific uplink channel, or a specific message in the second set of BWPs.

Aspect 49 is the apparatus of any of aspects 35 to 48, further including that the determined at least one of the TCI state or the spatial relation is associated with a specific UE, the specific UE being the UE.

Aspect 50 is the apparatus of any of aspects 35 to 48, further including that the determined at least one of the TCI state or the spatial relation is associated with a group of UEs including the UE.

Aspect 51 is the apparatus of any of aspects 35 to 50, further including that the second set of BWPs is also within a third hopping region, and the least one of the TCI state or the spatial relation is determined based on a default TCI state or a default spatial relation associated with the second and third hopping regions.

Aspect 52 is the apparatus of any of aspects 35 to 50, further including that the second set of BWPs is also within a third hopping region, and the at least one processor is further configured to: determine at least one of a second TCI state or a second spatial relation for communicating through the third hopping region based on the third hopping region, where the at least one of the TCI state or the spatial relation is determined based on the second hopping region.

Aspect 53 is the apparatus of any of aspects 35 to 50, further including that the second set of BWPs is also within a third hopping region, and the least one of the TCI state or the spatial relation is determined based on the second hopping region when the second set of BWPs has a greater overlap with the second hopping region than the third hopping region, and is determined based on the third hopping region when the second set of BWPs has a greater overlap with the third hopping region than the second hopping region.

Aspect 54 is the apparatus of any of aspects 35 to 53, further including that the determination of the at least one of the TCI state or the spatial relation is determined based on at least one of RRC signaling, DCI, or a MAC-CE.

Aspect 55 is the apparatus of any of aspects 35 to 54, further including that the determination of the at least one of the TCI state or the spatial relation is determined based on a MAC-CE activating a set of TCI states or spatial relations applicable to a plurality of hopping regions including the first hopping region and the second hopping region, or applicable to a plurality of BWPs including the first set of BWPs and the second set of BWPs.

Aspect 56 is the apparatus of any of aspects 35 to 55, further including that the UE comprises a reduced capability UE.

Aspect 57 is the apparatus of any of aspects 35 to 56, further including that at least one of the first set of BWPs or the second set of BWPs comprises a single BWP.

Aspect 58 is the apparatus of any of aspects 35 to 57, further including a transceiver coupled to the at least one processor.

Aspect 59 is a method of wireless communication for implementing any of aspects 35 to 58.

Aspect 60 is an apparatus for wireless communication including means for implementing any of aspects 35 to 58.

Aspect 61 is a non-transitory computer-readable storage medium storing computer executable code, where the code, when executed, causes a processor to implement any of aspects 35 to 58.

Aspect 62 is an apparatus for wireless communication at a base station including at least one processor coupled to a memory and configured to configure a UE with at least one of a first TCI state or a first spatial relation for communication through a first hopping region associated with a first set of BWPs; configure the UE with at least one of a second TCI state or a second spatial relation for communication through a second hopping region associated with a second set of BWPs; communicate with the UE through the first hopping region based on at least one of the first TCI state or the first spatial relation; and communicate, after switching communication from the first hopping region to the second hopping region, with the UE through the second hopping region based on at least one of the second TCI state or the second spatial relation.

Aspect 63 is the apparatus of aspect 62, further including that the second hopping region is associated with an anchor BWP included in the second set of BWPs, the anchor BWP is associated with at least one of a default TCI state or a default spatial relation, and at least one of the second TCI state or the second spatial relation is based on the at least one of the default TCI state or the default spatial relation.

Aspect 64 is the apparatus of any of aspects 62 and 63, further including that the at least one processor is further configured to: transmit, to the UE, a wideband TRS that is activated to be tracked in the first set of BWPs, and is configured to be within the first set of BWPs and the second set of BWPs, and where the communication through the second hopping region is further based on the wideband TRS in the second set of BWPs.

Aspect 65 is the apparatus of any of aspects 62 to 64, further including that the at least one of the first TCI state or the first spatial relation and the at least one of the second TCI state or the second spatial relation are associated with a same TRP.

Aspect 66 is the apparatus of any of aspects 62 to 64, further including that the at least one of the first TCI state or the first spatial relation and the at least one of the second TCI state or the second spatial relation are associated with different TRPs with a same PCI.

Aspect 67 is the apparatus of any of aspects 62 to 64, further including that the at least one of the first TCI state or the first spatial relation and the at least one of the second TCI state or the second spatial relation are associated with different TRPs with different PCIs.

Aspect 68 is the apparatus of any of aspects 62 to 67, further including that the communicating through the second hopping region is further based on at least one of a third TCI state or a third spatial relation associated with the second hopping region.

Aspect 69 is the apparatus of any of aspects 62 to 68, further including that the at least one of the second TCI state or the second spatial relation is determined differently than the at least one of the third TCI state or the third spatial relation.

Aspect 70 is the apparatus of any of aspects 62 to 68, further including that the at least one of the second TCI state or the second spatial relation is determined similarly to the at least one of the third TCI state or the third spatial relation.

Aspect 71 is the apparatus of any of aspects 62 to 70, further including that the second hopping region is associated with a non-activated TCI state or a non-activated spatial relation, and the communication through the second hopping region is based on at least one of the first TCI state or the first spatial relation associated with the first hopping region.

Aspect 72 is the apparatus of any of aspects 62 to 70, further including that the second hopping region is associated with a non-activated TCI state or a non-activated spatial relation, and the communication through the second hopping region is based on at least one of a default TCI state or a default spatial relation associated with the second hopping region.

Aspect 73 is the apparatus of any of aspects 62 to 70, further including that the second hopping region is associated with a non-activated TCI state or a non-activated spatial relation, and the communication through the second hopping region is based on the non-activated TCI state or the non-activated spatial relation.

Aspect 74 is the apparatus of any of aspects 62 to 73, further including that the communication through the second hopping region is associated with at least one of downlink channels, uplink channels, or messages in the second set of BWPs.

Aspect 75 is the apparatus of any of aspects 62 to 74, further including that the communication through the second hopping region is associated with at least one of a specific downlink channel, a specific uplink channel, or a specific message in the second set of BWPs.

Aspect 76 is the apparatus of any of aspects 62 to 75, further including that the at least one of the second TCI state or the second spatial relation is associated with a specific UE, the specific UE being the UE.

Aspect 77 is the apparatus of any of aspects 62 to 75, further including that the at least one of the second TCI state or the second spatial relation is associated with a group of UEs including the UE.

Aspect 78 is the apparatus of any of aspects 62 to 77, further including that the second set of BWPs is also within a third hopping region, and the communication through the second set of BWPs is based on a default TCI state or a default spatial relation associated with the second and third hopping regions.

Aspect 79 is the apparatus of any of aspects 62 to 77, further including that the second set of BWPs is also within a third hopping region, and the communication through the second set of BWPs is based on at least one of a third TCI state or a third spatial relation for communicating through the third hopping region based on the third hopping region.

Aspect 80 is the apparatus of any of aspects 62 to 77, further including that the second set of BWPs is also within a third hopping region, and communication through the second set of BWPs is based on the second hopping region when the second set of BWPs has a greater overlap with the second hopping region than the third hopping region, and is based on the third hopping region when the second set of BWPs has a greater overlap with the third hopping region than the second hopping region.

Aspect 81 is the apparatus of any of aspects 62 to 80, further including that at least one of the configuration for communicating through the first hopping region or the configuration for communicating through the second hopping region is indicated through at least one of RRC signaling, DCI, or a MAC-CE.

Aspect 82 is the apparatus of any of aspects 62 to 81, further including that the configurations for communication through the first hopping region and the second hopping region are through a MAC-CE activating a set of TCI states or spatial relations applicable to a plurality of hopping regions including the first hopping region and the second hopping region, or applicable to a plurality of BWPs including the first set of BWPs and the second set of BWPs.

Aspect 83 is the apparatus of any of aspects 62 to 82, further including at least one of the first set of BWPs or the second set of BWPs comprises a single BWP.

Aspect 84 is the apparatus of any of aspects 62 to 83, further including a transceiver coupled to the at least one processor.

Aspect 85 is a method of wireless communication for implementing any of aspects 62 to 84.

Aspect 86 is an apparatus for wireless communication including means for implementing any of aspects 62 to 84.

Aspect 87 is a non-transitory computer-readable storage medium storing computer executable code, where the code, when executed, causes a processor to implement any of aspects 62 to 84.

Aspect 88 is an apparatus for wireless communication at a UE including at least one processor coupled to a memory and configured to determine, while communicating using a first hopping region associated with a first set of BWPs, at least one of a TCI state or a spatial relation for communication using a second hopping region associated with a second set of BWPs; and communicate, after switching communication from the first hopping region to the second hopping region, using the second hopping region based on the determined at least one of the TCI state or the spatial relation.

Aspect 89 is the apparatus of aspect 88, further including that the second hopping region is associated with an anchor BWP included in the second set of BWPs, the anchor BWP is associated with at least one of a default TCI state or a default spatial relation, and the determined at least one of the TCI state or the spatial relation is based on the at least one of the default TCI state or the default spatial relation.

Aspect 90 is the apparatus of any of aspects 88 and 89, further including that the at least one processor is further configured to: determine a wideband TRS is activated to be tracked in the first set of BWPs, and is configured to span a portion of the first set of BWPs and a portion of the second set of BWPs; and track the wideband TRS in the second set of BWPs before switching the communication from the first hopping region to the second hopping region, where the communication using the second hopping region is further based on the tracked wideband TRS in the second set of BWPs.

Aspect 91 is the apparatus of any of aspects 88 to 90, further including that the first hopping region is associated with at least one of a second TCI state or a second spatial relation, and where the at least one of the TCI state or the spatial relation and the at least one of the second TCI state or the second spatial relation are associated with a same TRP.

Aspect 92 is the apparatus of any of aspects 88 to 90, further including that the first hopping region is associated with at least one of a second TCI state or a second spatial relation, and where the at least one of the TCI state or the spatial relation and the at least one of the second TCI state or the second spatial relation are associated with different TRPs with a same PCI.

Aspect 93 is the apparatus of any of aspects 88 to 90, further including that the first hopping region is associated with at least one of a second TCI state or a second spatial relation, and where the at least one of the TCI state or the spatial relation and the at least one of the second TCI state or the second spatial relation are associated with different TRPs with different PCIs.

Aspect 94 is the apparatus of any of aspects 88 to 93, further including that the at least one processor is further configured to: determine, while communicating using the first hopping region associated with the first set of BWPs, at least one of a second TCI state or a second spatial relation for communication using the second hopping region associated with the second set of BWPs, and where the communicating using the second hopping region is further based on the determined at least one of the second TCI state or the second spatial relation.

Aspect 95 is the apparatus of any of aspects 88 to 94, further including that the at least one of the TCI state or the spatial relation is determined differently than the at least one of the second TCI state or the second spatial relation.

Aspect 96 is the apparatus of any of aspects 88 to 94, further including that the at least one of the TCI state or the spatial relation is determined similarly to the at least one of the second TCI state or the second spatial relation.

Aspect 97 is the apparatus of any of aspects 88 to 96, further including that the second hopping region is associated with a non-activated TCI state or a non-activated spatial relation, and the at least one of the TCI state or the spatial relation is determined based on at least one of a second TCI state or a second spatial relation associated with the first hopping region.

Aspect 98 is the apparatus of any of aspects 88 to 96, further including that the second hopping region is associated with a non-activated TCI state or a non-activated spatial relation, and the at least one of the TCI state or the spatial relation is determined based on at least one of a default TCI state or a default spatial relation associated with the second hopping region.

Aspect 99 is the apparatus of any of aspects 88 to 96, further including that the second hopping region is associated with a non-activated TCI state or a non-activated spatial relation, and the at least one of the TCI state or the spatial relation is determined based on the non-activated TCI state or the non-activated spatial relation.

Aspect 100 is the apparatus of any of aspects 88 to 99, further including that the communication using the second hopping region is associated with at least one of downlink channels, uplink channels, or messages in the second set of BWPs.

Aspect 101 is the apparatus of any of aspects 88 to 100, further including that the communication using the second hopping region is associated with at least one of a specific downlink channel, a specific uplink channel, or a specific message in the second set of BWPs.

Aspect 102 is the apparatus of any of aspects 88 to 101, further including that the determined at least one of the TCI state or the spatial relation is associated with a specific UE, the specific UE being the UE.

Aspect 103 is the apparatus of any of aspects 88 to 101, further including that the determined at least one of the TCI state or the spatial relation is associated with a group of UEs including the UE.

Aspect 104 is the apparatus of any of aspects 88 to 103, further including that a first portion of the second set of BWPs is within the second hopping region and a second portion of the second set of BWPs is within a third hopping region, and the least one of the TCI state or the spatial relation is determined based on a default TCI state or a default spatial relation associated with the second and third hopping regions.

Aspect 105 is the apparatus of any of aspects 88 to 103, further including that a first portion of the second set of BWPs is within the second hopping region and a second portion of the second set of BWPs is within a third hopping region, the at least one processor further configured to: determine at least one of a second TCI state or a second spatial relation for communicating using the third hopping region based on the third hopping region, where the at least one of the TCI state or the spatial relation is determined based on the second hopping region.

Aspect 106 is the apparatus of any of aspects 88 to 103, further including that a first portion of the second set of BWPs is within the second hopping region and a second portion of the second set of BWPs is within a third hopping region, and the least one of the TCI state or the spatial relation is determined based on the second hopping region when the second set of BWPs has a greater overlap with the second hopping region than the third hopping region, and is determined based on the third hopping region when the second set of BWPs has a greater overlap with the third hopping region than the second hopping region.

Aspect 107 is the apparatus of any of aspects 88 to 160, further including that the determination of the at least one of the TCI state or the spatial relation is determined based on at least one of RRC signaling, DCI, or a MAC-CE.

Aspect 108 is the apparatus of any of aspects 88 to 107, further including that the determination of the at least one of the TCI state or the spatial relation is determined based on a MAC-CE activating a set of TCI states or spatial relations applicable to a plurality of hopping regions including the first hopping region and the second hopping region, or applicable to a plurality of BWPs including the first set of BWPs and the second set of BWPs.

Aspect 109 is the apparatus of any of aspects 88 to 108, further including that the UE comprises a reduced capability UE.

Aspect 110 is the apparatus of any of aspects 88 to 109, further including that at least one of the first set of BWPs or the second set of BWPs comprises a single BWP.

Aspect 111 is the apparatus of any of aspects 88 to 110, further including a transceiver coupled to the at least one processor.

Aspect 112 is a method of wireless communication for implementing any of aspects 88 to 111.

Aspect 113 is an apparatus for wireless communication including means for implementing any of aspects 88 to 111.

Aspect 114 is a non-transitory computer-readable storage medium storing computer executable code, where the code, when executed, causes a processor to implement any of aspects 88 to 111.

Aspect 115 is an apparatus for wireless communication at a base station including at least one processor coupled to a memory and configured to configure a UE with at least one of a first TCI state or a first spatial relation for communication using a first hopping region associated with a first set of BWPs; configure the UE with at least one of a second TCI state or a second spatial relation for communication using a second hopping region associated with a second set of BWPs; communicate with the UE using the first hopping region based on at least one of the first TCI state or the first spatial relation; and communicate, after switching communication from the first hopping region to the second hopping region, with the UE using the second hopping region based on at least one of the second TCI state or the second spatial relation.

Aspect 116 is the apparatus of aspect 115, further including that the second hopping region is associated with an anchor BWP included in the second set of BWPs, the anchor BWP is associated with at least one of a default TCI state or a default spatial relation, and at least one of the second TCI state or the second spatial relation is based on the at least one of the default TCI state or the default spatial relation.

Aspect 117 is the apparatus of any of aspects 115 and 116, further including that the at least one processor is further configured to: transmit, to the UE, a wideband TRS that is activated to be tracked in the first set of BWPs, and is configured to be within the first set of BWPs and the second set of BWPs, and where the communication using the second hopping region is further based on the wideband TRS in the second set of BWPs.

Aspect 118 is the apparatus of any of aspects 115 to 117, further including that the at least one of the first TCI state or the first spatial relation and the at least one of the second TCI state or the second spatial relation are associated with a same TRP.

Aspect 119 is the apparatus of any of aspects 115 to 117, further including that the at least one of the first TCI state or the first spatial relation and the at least one of the second TCI state or the second spatial relation are associated with different TRPs with a same PCI.

Aspect 120 is the apparatus of any of aspects 115 to 117, further including that the at least one of the first TCI state or the first spatial relation and the at least one of the second TCI state or the second spatial relation are associated with different TRPs with different PCIs.

Aspect 121 is the apparatus of any of aspects 115 to 120, further including that the communicating using the second hopping region is further based on at least one of a third TCI state or a third spatial relation associated with the second hopping region.

Aspect 122 is the apparatus of any of aspects 115 to 121, further including that the at least one of the second TCI state or the second spatial relation is determined differently than the at least one of the third TCI state or the third spatial relation.

Aspect 123 is the apparatus of any of aspects 115 to 121, further including that the at least one of the second TCI state or the second spatial relation is determined similarly to the at least one of the third TCI state or the third spatial relation.

Aspect 124 is the apparatus of any of aspects 115 to 123, further including that the second hopping region is associated with a non-activated TCI state or a non-activated spatial relation, and the communication using the second hopping region is based on at least one of the first TCI state or the first spatial relation associated with the first hopping region.

Aspect 125 is the apparatus of any of aspects 115 to 123, further including that the second hopping region is associated with a non-activated TCI state or a non-activated spatial relation, and the communication using the second hopping region is based on at least one of a default TCI state or a default spatial relation associated with the second hopping region.

Aspect 126 is the apparatus of any of aspects 115 to 123, further including that the second hopping region is associated with a non-activated TCI state or a non-activated spatial relation, and the communication using the second hopping region is based on the non-activated TCI state or the non-activated spatial relation.

Aspect 127 is the apparatus of any of aspects 115 to 126, further including that the communication using the second hopping region is associated with at least one of downlink channels, uplink channels, or messages in the second set of BWPs.

Aspect 128 is the apparatus of any of aspects 115 to 127, further including that the communication using the second hopping region is associated with at least one of a specific downlink channel, a specific uplink channel, or a specific message in the second set of BWPs.

Aspect 129 is the apparatus of any of aspects 115 to 128, further including that the at least one of the second TCI state or the second spatial relation is associated with a specific UE, the specific UE being the UE.

Aspect 130 is the apparatus of any of aspects 115 to 128, further including that the at least one of the second TCI state or the second spatial relation is associated with a group of UEs including the UE.

Aspect 131 is the apparatus of any of aspects 115 to 130, further including that a first portion of the second set of BWPs is within the second hopping region and a second portion of the second set of BWPs is within a third hopping region, and the communication using the second set of BWPs is based on a default TCI state or a default spatial relation associated with the second and third hopping regions.

Aspect 132 is the apparatus of any of aspects 115 to 130, further including that a first portion of the second set of BWPs is within the second hopping region and a second portion of the second set of BWPs is within a third hopping region, and the communication using the second set of BWPs is based on at least one of a third TCI state or a third spatial relation for communicating using the third hopping region based on the third hopping region.

Aspect 133 is the apparatus of any of aspects 115 to 130, further including that a first portion of the second set of BWPs is within the second hopping region and a second portion of the second set of BWPs is within a third hopping region, and communication using the second set of BWPs is based on the second hopping region when the second set of BWPs has a greater overlap with the second hopping region than the third hopping region, and is based on the third hopping region when the second set of BWPs has a greater overlap with the third hopping region than the second hopping region.

Aspect 134 is the apparatus of any of aspects 115 to 133, further including that at least one of the configuration for communicating using the first hopping region or the configuration for communicating using the second hopping region is indicated through at least one of RRC signaling, DCI, or a MAC-CE.

Aspect 135 is the apparatus of any of aspects 115 to 134, further including that the configurations for communication using the first hopping region and the second hopping region are through a MAC-CE activating a set of TCI states or spatial relations applicable to a plurality of hopping regions including the first hopping region and the second hopping region, or applicable to a plurality of BWPs including the first set of BWPs and the second set of BWPs.

Aspect 136 is the apparatus of any of aspects 115 to 135, further including that at least one of the first set of BWPs or the second set of BWPs comprises a single BWP.

Aspect 137 is the apparatus of any of aspects 115 to 136, further including that a transceiver coupled to the at least one processor.

Aspect 138 is a method of wireless communication for implementing any of aspects 115 to 137.

Aspect 139 is an apparatus for wireless communication including means for implementing any of aspects 115 to 137.

Aspect 140 is a non-transitory computer-readable storage medium storing computer executable code, where the code, when executed, causes a processor to implement any of aspects 115 to 137.

Aspect 141 is an apparatus for wireless communication at a UE including at least one processor coupled to a memory and configured to determine, while communicating using a first frequency range comprising a first set of frequency hops, at least one of a TCI state or a spatial relation for communicating using a second frequency range comprising a second set of frequency hops; and communicate, after switching communication from the first frequency range to the second frequency range, through the second frequency range based on the determined at least one of the TCI state or the spatial relation.

Aspect 142 is the apparatus of aspect 141, further including that the first frequency range comprises a first hopping region and the second frequency range comprises a second hopping region.

Aspect 143 is the apparatus of any of aspects 141 and 142, further including that the first frequency range comprises a first BWP and the second frequency range comprises a second BWP.

Aspect 144 is the apparatus of any of aspects 141 to 143, further including that switching communication from the first frequency range to the second frequency range is based on a hopping pattern within a BWP, and the first frequency range comprises a first subset frequency range in the BWP and the second frequency range comprises a second subset frequency range in the BWP.

Aspect 145 is a method of wireless communication for implementing any of aspects 141 to 144.

Aspect 146 is an apparatus for wireless communication including means for implementing any of aspects 141 to 144.

Aspect 147 is a non-transitory computer-readable storage medium storing computer executable code, where the code, when executed, causes a processor to implement any of aspects 141 to 144.

Aspect 148 is an apparatus for wireless communication at a base station including at least one processor coupled to a memory and configured to configure a UE with at least one of a first TCI state or a first spatial relation for communication using a first frequency range comprising a first set of frequency hops; configure the UE with at least one of a second TCI state or a second spatial relation for communication using a second frequency range comprising a second set of frequency hops; communicate with the UE using the first frequency range based on at least one of the first TCI state or the first spatial relation; and communicate, after switching communication from the first frequency to the second frequency range, with the UE using the second frequency range based on at least one of the second TCI state or the second spatial relation.

Aspect 149 is the apparatus of aspect 148, further including that the first frequency range comprises a first hopping region and the second frequency range comprises a second hopping region.

Aspect 150 is the apparatus of any of aspects 148 and 149, further including that the first frequency range comprises a first BWP and the second frequency range comprises a second BWP.

Aspect 151 is the apparatus of any of aspects 148 to 150, further including that switching communication from the first frequency range to the second frequency range is based on a hopping pattern within a BWP, and the first frequency range comprises a first subset frequency range in the BWP and the second frequency range comprises a second subset frequency range in the BWP.

Aspect 152 is a method of wireless communication for implementing any of aspects 148 to 151.

Aspect 153 is an apparatus for wireless communication including means for implementing any of aspects 148 to 151.

Aspect 154 is a non-transitory computer-readable storage medium storing computer executable code, where the code, when executed, causes a processor to implement any of aspects 148 to 151.

What is claimed is:

1. An apparatus for wireless communication at a user equipment (UE), comprising:
    a processing system that includes one or more processors and one or more memories coupled with the one or more processors, the processing system configured to cause the apparatus to:
        identify, while communicating using a first frequency range comprising a first set of frequency hops, at least one of a transmission configuration indication (TCI) state or a spatial relation for communicating using a second frequency range comprising a second set of frequency hops; and
        communicate, after switching communication from the first frequency range to the second frequency range, using the second frequency range in accordance with the at least one of the TCI state or the spatial relation.

2. The apparatus of claim 1, wherein the first frequency range comprises a first hopping region associated with a first set of bandwidth parts (BWPs), and the second frequency range comprises a second hopping region associated with a second set of BWPs.

3. The apparatus of claim 1, wherein the second frequency range is associated with an anchor frequency hop included in the second set of frequency hops, the anchor frequency hop being associated with at least one of a default TCI state or a default spatial relation, and the at least one of the TCI state or the spatial relation being in accordance with the at least one of the default TCI state or the default spatial relation.

4. The apparatus of claim 1, wherein the processing system is further configured to:
track a wideband tracking reference signal (TRS) in the second set of frequency hops before switching the communication from the first frequency range to the second frequency range, wherein the communicating through the second frequency range is further in accordance with the tracked wideband TRS in the second set of frequency hops, and wherein the wideband TRS is configured to be within the first set of frequency hops and the second set of frequency hops.

5. The apparatus of claim 1, wherein the first frequency range is associated with at least one of a second TCI state or a second spatial relation, and wherein the at least one of the TCI state or the spatial relation and the at least one of the second TCI state or the second spatial relation are associated with a same transmission-reception point (TRP).

6. The apparatus of claim 1, wherein the first frequency range is associated with at least one of a second TCI state or a second spatial relation, and wherein the at least one of the TCI state or the spatial relation and the at least one of the second TCI state or the second spatial relation are associated with different transmission-reception points (TRPs) with a same physical layer cell identity (PCI).

7. The apparatus of claim 1, wherein the first frequency range is associated with at least one of a second TCI state or a second spatial relation, and wherein the at least one of the TCI state or the spatial relation and the at least one of the second TCI state or the second spatial relation are associated with different transmission-reception points (TRPs) with different physical layer cell identities (PCIs).

8. The apparatus of claim 1, wherein the processing system is further configured to:
identify, while communicating through the first frequency range associated with the first set of frequency hops, at least one of a second TCI state or a second spatial relation for communicating through the second frequency range associated with the second set of frequency hops,
wherein the communicating through the second frequency range is further in accordance with the at least one of the second TCI state or the second spatial relation.

9. The apparatus of claim 1, wherein the second frequency range is associated with a non-activated TCI state or a non-activated spatial relation, and the at least one of the TCI state or the spatial relation is identified in accordance with at least one of a second TCI state or a second spatial relation associated with the first frequency range.

10. The apparatus of claim 1, wherein the second frequency range is associated with a non-activated TCI state or a non-activated spatial relation, and the at least one of the TCI state or the spatial relation is identified in accordance with at least one of a default TCI state or a default spatial relation associated with the second frequency range.

11. The apparatus of claim 1, wherein the second frequency range is associated with a non-activated TCI state or a non-activated spatial relation, and the at least one of the TCI state or the spatial relation is identified in accordance with the non-activated TCI state or the non-activated spatial relation.

12. The apparatus of claim 1, wherein the at least one of the TCI state or the spatial relation is associated with a specific UE, the specific UE being the UE.

13. The apparatus of claim 1, wherein the at least one of the TCI state or the spatial relation is associated with a group of UEs including the UE.

14. The apparatus of claim 1, wherein the second set of frequency hops is also within a third frequency range, and the least one of the TCI state or the spatial relation identified in accordance with a default TCI state or a default spatial relation associated with the second frequency range and the third frequency range.

15. The apparatus of claim 1, wherein the second set of frequency hops is also within a third frequency range, and the processing system is further configured to:
identify at least one of a second TCI state or a second spatial relation for communicating through the third frequency range in accordance with the third frequency range, wherein the at least one of the TCI state or the spatial relation is identified in accordance with the second frequency range.

16. The apparatus of claim 1, wherein the second set of frequency hops is also within a third frequency range, and the least one of the TCI state or the spatial relation is identified in accordance with the second frequency range when the second set of frequency hops has a greater overlap with the second frequency range than the third frequency range, and is identified in accordance with the third frequency range when the second set of frequency hops has the greater overlap with the third frequency range than the second frequency range.

17. The apparatus of claim 1, wherein the identification of the at least one of the TCI state or the spatial relation is identified in accordance with a media access control-control element (MAC-CE) activating a set of TCI states or spatial relations applicable to a plurality of frequency ranges including the first frequency range and the second frequency range, or applicable to a plurality of frequency hops including the first set of frequency hops and the second set of frequency hops.

18. The apparatus of claim 1, wherein the UE comprises a reduced capability UE.

19. The apparatus of claim 1, further comprising a transceiver coupled to the processing system.

20. A method of wireless communication at a user equipment (UE), comprising:
identify, while communicating using a first frequency range comprising a first set of frequency hops, at least one of a transmission configuration indication (TCI) state or a spatial relation for communicating using a second frequency range comprising a second set of frequency hops; and
communicating, after switching communication from the first frequency range to the second frequency range, using the second frequency range identified in accordance with at least one of the TCI state or the spatial relation.

21. An apparatus for wireless communication at a base station, comprising:
a processing system that includes one or more processors and one or more memories coupled with the one or more processors, the processing system configured to cause the apparatus to:
configure a user equipment (UE) with at least one of a first transmission configuration indication (TCI) state or a first spatial relation for communication through a first frequency range associated with a first set of frequency hops;
configure the UE with at least one of a second TCI state or a second spatial relation for communication through a second frequency range associated with a second set of frequency hops;

communicate with the UE through the first frequency range in accordance with at least one of the first TCI state or the first spatial relation; and communicate, after switching communication from the first frequency range to the second frequency range, with the UE through the second frequency range in accordance with at least one of the second TCI state or the second spatial relation.

22. The apparatus of claim 21, wherein the first frequency range comprises a first hopping region associated with a first set of BWPs, and the second frequency range comprises a second hopping region associated with a second set of BWPs.

23. The apparatus of claim 21, wherein the second frequency range is associated with an anchor frequency hop included in the second set of frequency hops, the anchor frequency hop being associated with at least one of a default TCI state or a default spatial relation, and at least one of the second TCI state or the second spatial relation being in accordance with the at least one of the default TCI state or the default spatial relation.

24. The apparatus of claim 21, wherein the processing system is further configured to:

transmit, to the UE, a wideband tracking reference signal (TRS) that is activated to be tracked in the first set of frequency hops, and is configured to be within the first set of frequency hops and the second set of frequency hops, wherein the communicating through the second frequency range is further in accordance with the wideband TRS in the second set of frequency hops.

25. The apparatus of claim 21, wherein the communicating through the second frequency range is further in accordance with at least one of a third TCI state or a third spatial relation associated with the second frequency range.

26. The apparatus of claim 21, wherein the second frequency range is associated with a non-activated TCI state or a non-activated spatial relation, and the communicating through the second frequency range is in accordance with at least one of the first TCI state or the first spatial relation associated with the first frequency range.

27. The apparatus of claim 21, wherein the second frequency range is associated with a non-activated TCI state or a non-activated spatial relation, and the communicating through the second frequency range is in accordance with at least one of a default TCI state or a default spatial relation associated with the second frequency range.

28. The apparatus of claim 21, wherein the second frequency range is associated with a non-activated TCI state or a non-activated spatial relation, and the communication through the second frequency range is in accordance with the non-activated TCI state or the non-activated spatial relation.

29. The apparatus of claim 21, further comprising a transceiver coupled to the processing system.

30. A method of wireless communication at a base station, comprising:

configuring a user equipment (UE) with at least one of a first transmission configuration indication (TCI) state or a first spatial relation for communication through a first frequency range associated with a first set of frequency hops;

configuring the UE with at least one of a second TCI state or a second spatial relation for communication through a second frequency range associated with a second set of frequency hops;

communicating with the UE through the first frequency range in accordance with at least one of the first TCI state or the first spatial relation; and communicating, after switching communication from the first frequency range to the second frequency range, with the UE through the second frequency range in accordance with at least one of the second TCI state or the second spatial relation.

* * * * *